(12) United States Patent
Sakai et al.

(10) Patent No.: US 11,993,230 B2
(45) Date of Patent: May 28, 2024

(54) VEHICLE CLEANER SYSTEM AND VEHICLE INCLUDING VEHICLE CLEANER SYSTEM

(71) Applicant: KOITO MANUFACTURING CO., LTD., Tokyo (JP)

(72) Inventors: Masaru Sakai, Shizuoka (JP); Masayuki Kondo, Shizuoka (JP); Kazuki Kawamura, Shizuoka (JP); Akinobu Kubota, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/622,118

(22) PCT Filed: May 18, 2018

(86) PCT No.: PCT/JP2018/019254
§ 371 (c)(1),
(2) Date: Dec. 12, 2019

(87) PCT Pub. No.: WO2018/230255
PCT Pub. Date: Dec. 20, 2018

(65) Prior Publication Data
US 2020/0180567 A1    Jun. 11, 2020

(30) Foreign Application Priority Data

Jun. 13, 2017 (JP) ................................. 2017-115872
Jun. 13, 2017 (JP) ................................. 2017-115873
(Continued)

(51) Int. Cl.
*B60S 1/48* (2006.01)
*B60S 1/52* (2006.01)
(Continued)

(52) U.S. Cl.
CPC ................. *B60S 1/485* (2013.01); *B60S 1/52* (2013.01); *B60S 1/58* (2013.01); *B60S 1/603* (2013.01)

(58) Field of Classification Search
None
See application file for complete search history.

(56) References Cited

U.S. PATENT DOCUMENTS 5,170,107 A * 12/1992 Araki ...................... B60S 1/481
                                                          318/443
5,988,529 A    11/1999 Suhring
(Continued)

FOREIGN PATENT DOCUMENTS

DE         3825178 A1 *  2/1990
DE    102011121312 A1 *  6/2013 ............ B60S 1/0862
(Continued)

OTHER PUBLICATIONS

Partial Supplementary European Search Report issued in European Application No. 18817577.2, dated Feb. 22, 2021 (13 pages).
(Continued)

*Primary Examiner* — Michael E Barr
*Assistant Examiner* — Omair Chaudhri
(74) *Attorney, Agent, or Firm* — Osha Bergman Watanabe & Burton LLP

(57) ABSTRACT

A vehicle cleaner system that includes a single pump and a plurality of cleaners which are connected to the single pump and clean different cleaning target objects with a cleaning medium is disclosed. The cleaning target objects include a sensor which detects information on outside of a vehicle and a cleaner control unit which operates the plurality of cleaners in accordance with input of a signal. The cleaner control
(Continued)

unit is capable of operating the plurality of cleaners such that cleaning methods of the plurality of cleaners are different from each other.

5 Claims, 29 Drawing Sheets

(30) Foreign Application Priority Data

| Jun. 13, 2017 | (JP) | ................................. 2017-115875 |
| Jun. 13, 2017 | (JP) | ................................. 2017-115877 |

(51) Int. Cl.
    *B60S 1/58*     (2006.01)
    *B60S 1/60*     (2006.01)

(56) References Cited

U.S. PATENT DOCUMENTS

| 2002/0100136 | A1* | 8/2002 | Waters ................. B60R 1/0602 15/250.003 |
| 2003/0222156 | A1* | 12/2003 | Bissonnette ............ B60S 1/481 239/284.1 |
| 2006/0157639 | A1 | 7/2006 | Shaffer et al. |
| 2011/0061192 | A1* | 3/2011 | Mueller ................ B60S 1/0452 15/250.31 |
| 2011/0266375 | A1* | 11/2011 | Ono ..................... B60S 1/0848 239/589 |
| 2012/0117745 | A1* | 5/2012 | Hattori ..................... B60S 1/54 134/198 |
| 2012/0266403 | A1* | 10/2012 | Fitterer .................... B60S 1/08 15/250.04 |
| 2012/0266926 | A1* | 10/2012 | Kikuta ................. B60S 1/0848 134/58 R |
| 2013/0037627 | A1* | 2/2013 | Kikuta ................ A01M 7/0089 239/284.1 |
| 2013/0048035 | A1* | 2/2013 | Doi ......................... B60S 1/48 134/123 |
| 2013/0092758 | A1* | 4/2013 | Tanaka ..................... B60S 1/52 239/284.1 |
| 2013/0255023 | A1* | 10/2013 | Kikuta ..................... B60S 1/56 15/250.02 |
| 2014/0367488 | A1* | 12/2014 | Dominique ............. B60S 1/481 239/284.1 |
| 2015/0183404 | A1* | 7/2015 | Romack ................. B60S 1/485 239/284.1 |
| 2015/0203077 | A1 | 7/2015 | Gokan |
| 2015/0296108 | A1* | 10/2015 | Hayakawa ................ B60R 1/00 348/148 |
| 2016/0016536 | A1* | 1/2016 | Merwald ............... B60S 1/0818 701/36 |
| 2016/0282865 | A1* | 9/2016 | Shimizu ................ B60S 1/0848 |
| 2017/0021810 | A1 | 1/2017 | Trebouet et al. |
| 2017/0036650 | A1* | 2/2017 | Hester ...................... B60S 1/52 |
| 2017/0259789 | A1* | 9/2017 | McAndrew ............. B07B 1/145 |
| 2018/0162327 | A1* | 6/2018 | Lansinger ............... F24H 1/009 |
| 2018/0229692 | A1* | 8/2018 | Li ......................... B60S 1/0818 |
| 2018/0312141 | A1* | 11/2018 | Ghannam ................. B60S 1/56 |
| 2018/0354469 | A1* | 12/2018 | Krishnan ............. G01S 17/931 |
| 2019/0099768 | A1 | 4/2019 | Romack et al. |
| 2019/0161035 | A1* | 5/2019 | Salter ..................... G01D 5/145 |
| 2019/0225189 | A1* | 7/2019 | Maeda ............... B60H 1/00785 |
| 2020/0130651 | A1* | 4/2020 | Waible .................... B60S 1/481 |
| 2020/0139936 | A1* | 5/2020 | Yamauchi ................ B60S 1/36 |
| 2020/0391702 | A1* | 12/2020 | Yamauchi ............... B60Q 9/00 |

FOREIGN PATENT DOCUMENTS

| DE | 102014210608 A1 | 12/2015 | |
| EP | 1125807 B1 * | 2/2010 | ............. B60S 1/481 |
| EP | 2639121 A2 | 9/2013 | |
| FR | 2907081 A1 * | 4/2008 | ............. B60S 1/488 |
| JP | S57-164845 A | 10/1982 | |
| JP | S57-200468 U | 12/1982 | |
| JP | S58161756 U | 10/1983 | |
| JP | S60-076557 U | 5/1985 | |
| JP | S61-253249 A | 11/1986 | |
| JP | 2006143150 A | 6/2006 | |
| JP | 2006182040 | * 7/2006 | |
| JP | 2006182040 A | 7/2006 | |
| JP | 2007-253731 A | 10/2007 | |
| JP | 2013079002 A | 5/2013 | |
| JP | 2013144536 A | 7/2013 | |
| JP | 2013208991 A | 10/2013 | |
| JP | 2015137070 A | 7/2015 | |
| JP | 2015137070 A * | 7/2015 | ................ B60S 1/56 |
| JP | 2015231765 A | 12/2015 | |
| JP | 3-204710 U | 6/2016 | |
| JP | 2016172486 A | 9/2016 | |
| JP | 2016187990 A | 11/2016 | |
| JP | 2017-024712 A | 2/2017 | |
| KR | 100229447 B1 * | 8/2000 | |
| KR | 20150130190 A * | 11/2015 | |
| WO | 2013126139 A1 | 8/2013 | |
| WO | 2014010578 A1 | 1/2014 | |
| WO | 2015120866 A1 | 8/2015 | |
| WO | 2018135469 A1 | 7/2018 | |

OTHER PUBLICATIONS

International Search Report issued in International Application No. PCT/JP2018/019254, dated Jul. 31, 2018 (9 pages).
Written Opinion issued in International Application No. PCT/JP2018/019254; dated Jul. 31, 2018 (6 pages).
Office Action issued in U.S. Appl. No. 16/622,774; dated Nov. 29, 2021 (17 pages).
Notice of Reasons for Refusal in corresponding Japanese Application No. 2021-150007, dated Oct. 18, 2022 (7 pages).
Extended European Search Report issued in counterpart European Application No. 23203350.6, dated Jan. 29, 2024 (7 pages).

\* cited by examiner

VEHICLE CLEANER SYSTEM AND VEHICLE INCLUDING VEHICLE CLEANER SYSTEM

TECHNICAL FIELD

The present invention relates to a vehicle cleaner system which cleans a cleaning target object and a vehicle including the vehicle cleaner system.

BACKGROUND ART

A vehicle headlamp cleaner is known in Patent Literature 1.

CITATION LIST

Patent Literature

[PTL 1] JP-A-2016-187990

SUMMARY OF INVENTION

Technical Problem

In recent years, attempts have been made to develop vehicles that can be driven automatically. In order to realize automatic driving, it is required to maintain good sensitivity of in-vehicle sensors such as LiDAR and cameras. Therefore, there is a need for a sensor cleaner configured to clean these in-vehicle sensors. An appropriate cleaning method differs depending on a location and type of cleaning target objects, such as the in-vehicle sensors. However, if a separate pump is provided for each of these cleaning target objects, a system becomes complicated and costs are increased.

A large amount of cleaning medium is required to clean the various sensors in addition to a headlamp and a window shield, while a storage amount of the cleaning medium is limited.

There is a need for a cleaner which cleans these sensors in addition to cleaning the headlamp. Therefore, the present inventor has studied a cleaner which sprays cleaning liquid to clean the cleaning target object and sprays air to clean the cleaning target object.

An object of the present invention is to provide a vehicle cleaner system which can reduce cost and perform cleaning with an appropriate cleaning method for each cleaning target object, and a vehicle including the vehicle cleaner system.

Another object of the present invention is to provide a cleaner system which can reduce an amount of cleaning media used and maintain cleanliness of the cleaning target object.

Another object of the present invention is to provide an easy-to-use vehicle cleaner system which can spray cleaning liquid and air.

Solution to Problem

In order to achieve the above objects, a vehicle cleaner system according to the present invention includes:
a single pump;
a plurality of cleaners, which are connected to the single pump and clean different cleaning target objects with a cleaning medium, the cleaning target objects including a sensor which detects information on outside of a vehicle; and
a cleaner control unit which operates the plurality of cleaners in accordance with input of a signal.

The cleaner control unit is capable of operating the plurality of cleaners such that cleaning methods of the plurality of cleaners are different from each other.

According to the above configuration, the cleaning method is different for each cleaner, for example, when the single pump is used to clean a plurality of cleaning target objects whose locations and types are different. For this reason, as compared with a case where a separate pump is used for each cleaning target object, a cost can be reduced, and the cleaning target object can be cleaned with an appropriate cleaning method.

In the vehicle cleaner system according to the present invention,
as the cleaning methods, at least one of a number of times of operations of the plurality of cleaners in accordance with a predetermined number of times of the input of the signal, a spray time of the cleaning medium, a spray amount of the cleaning medium, a spray pressure of the cleaning medium, and a spray area of the cleaning medium may be different.

For example, by differentiating the cleaning methods in the cleaner control unit as described above, cleaning can be performed with an appropriate cleaning method for each cleaning target object and with low cost.

In the vehicle cleaner system according to the present invention,
the cleaners may include: a sensor cleaner which cleans the sensor; and at least one of a window washer which cleans a window shield of the vehicle and a lamp cleaner which cleans a lamp of the vehicle.

The cleaner control unit may be capable of changing a magnitude relationship between a number of times of operations of the sensor cleaner and a number of times of operations of at least one of the window washer and the lamp cleaner.

According to the above configuration, a suitable magnitude relationship can be selected between the number of times of operations of the sensor cleaner and the number of times of operations of the window washer and/or the lamp cleaner corresponding to various scenes.

In the vehicle cleaner system according to the present invention,
the cleaners may include: the sensor cleaner which cleans the sensor; and the lamp cleaner which cleans the lamp of the vehicle.

A spray pressure of the cleaning medium in the sensor cleaner may be higher than a spray pressure of the cleaning medium in the lamp cleaner.

It is preferable to spray the cleaning medium at a higher pressure on the sensor whose required cleanliness is higher than the lamp.

In the vehicle cleaner system according to the present invention,
cleaning liquid and air are capable of being supplied to the sensor cleaner as the cleaning medium.

Residual cleaning liquid on a sensor surface can be reliably prevented by spraying air separately from the cleaning liquid to sensors where the residual cleaning liquid is likely to be troublesome.

In the vehicle cleaner system according to the present invention,
the cleaners may include: a plurality of sensor cleaners which respectively clean a plurality of sensors, the plurality of sensors being different from each other in at least one of a detection method and a mounting position in the vehicle.

The cleaner control unit may be configured to operate the plurality of sensor cleaners such that cleaning methods of the plurality of sensor cleaners are different from each other.

For example, sensors having different detection methods, such as LiDAR and cameras, often require different scenes. Dirt is also different depending on the mounting position of the sensors. Therefore, by differentiating the cleaning methods for each type of sensor, cleanliness can be easily maintained for each sensor according to specific scenes.

A vehicle cleaner system according to another example of the present invention includes:

a single pump; and a plurality of cleaners, which are connected to the single pump and clean different cleaning target objects with a cleaning medium, the cleaning target objects including a sensor which detects information on outside of a vehicle.

At least one of a type of the cleaning medium; a spray shape of the cleaning medium; a nozzle shape of the plurality of cleaners; presence or absence of a wiper; presence or absence of a check valve; and a location of the cleaning target objects is different.

For example, by differentiating the cleaning methods as described above, cleaning can be performed with an appropriate cleaning method for each cleaning target object and with low cost.

In the vehicle cleaner system according to the present invention, the cleaners may include a sensor cleaner which cleans the sensor, and the sensor cleaner may include a fluidics mechanism which changes a flow path of the cleaning medium.

Since the fluidics mechanism is provided, the cleaning medium can be sprayed to the sensor at a high pressure and a wide area can be cleaned.

In order to achieve the above objects, another vehicle cleaner system according to the present invention includes:

a window washer which cleans a window shield of a vehicle with a cleaning medium;

a first pump configured to supply the cleaning medium to the window washer;

a sensor cleaner which cleans, with the cleaning medium, a sensor which detects information on outside of the vehicle; and a second pump configured to supply the cleaning medium to the sensor cleaner.

A first pipe line, which is connected between the window washer and the first pump and supplies the cleaning medium to the window washer, is different from a second pipe line which is connected between the sensor cleaner and the second pump and supplies the cleaning medium to the sensor cleaner.

According to the cleaner system according to the present invention, by differentiating the pipe lines of the window washer and the sensor cleaner, the cleaning methods such as the spray pressure, the spray time, and the number of times of spray of the cleaning medium can be changed in accordance with the cleaning target objects. For this reason, each cleaning target object can be cleaned with an appropriate cleaning method.

In the vehicle cleaner system according to the present invention, a cleaner control unit which is capable of controlling the first pump and the second pump may further be included.

According to this configuration, cleaner control processing is facilitated by controlling the respective pumps in a unified manner.

In the vehicle cleaner system according to the present invention, the first pump and the second pump may be controlled such that a spray pressure of the cleaning medium from the sensor cleaner is higher than a spray pressure of the cleaning medium from the window washer.

It is preferable to spray the cleaning medium at a higher pressure on the sensor whose required cleanliness is higher than the window shield.

In the vehicle cleaner system according to the present invention, the second pipe line may be thicker than the first pipe line.

According to this configuration, the cleaning medium can be sprayed to the sensor at a higher pressure to perform cleaning with a simple configuration.

In the vehicle cleaner system according to the present invention, the second pipe line may be shorter than the first pipe line.

According to this configuration, the cleaning medium can be sprayed to the sensor at a higher pressure to perform cleaning with a simple configuration.

In order to achieve the above objects, another vehicle cleaner system according to the present invention is a vehicle cleaner system configured to clean a cleaning target object, which includes:

a cleaner which sprays a cleaning medium onto a cleaning target surface of the cleaning target object and cleans the cleaning target surface; and a cleaner control unit which operates the cleaner on the cleaning target surface which includes a plurality of regions, so as to make cleaning strength for at least one of the plurality of regions different from cleaning strength for other regions.

According to the cleaner system according to the present disclosure, since the cleaning medium can be efficiently sprayed to the region to be cleaned on the cleaning target surface, the cleaning medium can be saved, and cleanliness of the cleaning target object can be maintained.

In the vehicle cleaner system according to the present invention, a difference in the cleaning strength includes at least one of differences in a number of times of spray; a spray time; a spray amount; a spray pressure; and a spray area of the cleaning medium.

According to this configuration, the cleaning method can be changed depending on the region of the cleaning target surface, thus cleaning efficiency can be improved.

In the vehicle cleaner system according to the present invention, a dirt detection unit which detects which region among the plurality of regions is dirty may further be included.

The cleaner control unit may change the cleaning strength in accordance with output of the dirt detection unit.

According to this configuration, since the cleaning medium can be sprayed only to a portion where dirt is detected, the cleaning medium can be saved, and the spray pressure of the cleaning medium sprayed to the region to be cleaned can be increased, for example. Accordingly, cleaning efficiency can be improved, and cleanliness of the cleaning target object can be maintained.

In the vehicle cleaner system according to the present invention, the plurality of regions may be configured by regions divided in a left-right direction of the cleaning target surface.

As described above, it is preferable that the region to be cleaned is divided.

In the vehicle cleaner system according to the present invention, the cleaner may include a nozzle which includes at least one opening portion which sprays the cleaning medium.

A direction of the at least one opening portion may be changeable so as to face each of the plurality of regions.

In the vehicle cleaner system according to the present invention, the cleaner may include a nozzle which includes a plurality of opening portions which spray the cleaning medium.

The plurality of opening portions may be disposed so as to correspond to each of the plurality of regions.

In the vehicle cleaner system according to the present invention, the cleaner may include a plurality of nozzles which spray the cleaning medium.

The plurality of nozzles may be disposed on at least three sides of the cleaning target object: left side, right side and upper side.

According to these configurations, the region to be cleaned can be easily changed.

A vehicle cleaner system according to another aspect of the present invention includes:

a cleaner which cleans a vehicle component which is at least one of a vehicle window, a lamp, and a sensor capable of acquiring information on outside of the vehicle; and a drive control unit which operates the cleaner.

The cleaner includes: an air nozzle which sprays air onto the vehicle component; and a liquid nozzle which sprays cleaning liquid onto the vehicle component.

only a first signal which operates the air nozzle and the liquid nozzle, and a second signal which operates the air nozzle without operating the liquid nozzle are input into the drive control unit.

A vehicle including the vehicle cleaner system according to the present invention includes:

the vehicle cleaner system having any one of the configurations described above.

According to the above configuration, as compared with a case where a separate pump is used for each cleaning target object mounted on the vehicle, a cost can be reduced, and the cleaning target object can be cleaned with an appropriate cleaning method.

According to the above configuration, the amount of cleaning media used can be reduced, and the cleanliness of the cleaning target object can be maintained.

Advantageous Effects of Invention

According to the vehicle cleaner system and the vehicle including the vehicle cleaner system according to the present invention, as compared with the case where the separate pump is used for each cleaning target object, the cost can be reduced, and the cleaning target object can be cleaned with the appropriate cleaning method.

According to the vehicle cleaner system and the vehicle including the vehicle cleaner system according to the present invention, the amount of cleaning media used can be reduced, and the cleanliness of the cleaning target object can be maintained.

According to the one aspect of the present invention, the easy-to-use vehicle cleaner system which can spray the cleaning liquid and the air is provided.

DESCRIPTION OF EMBODIMENTS

Figure 1:
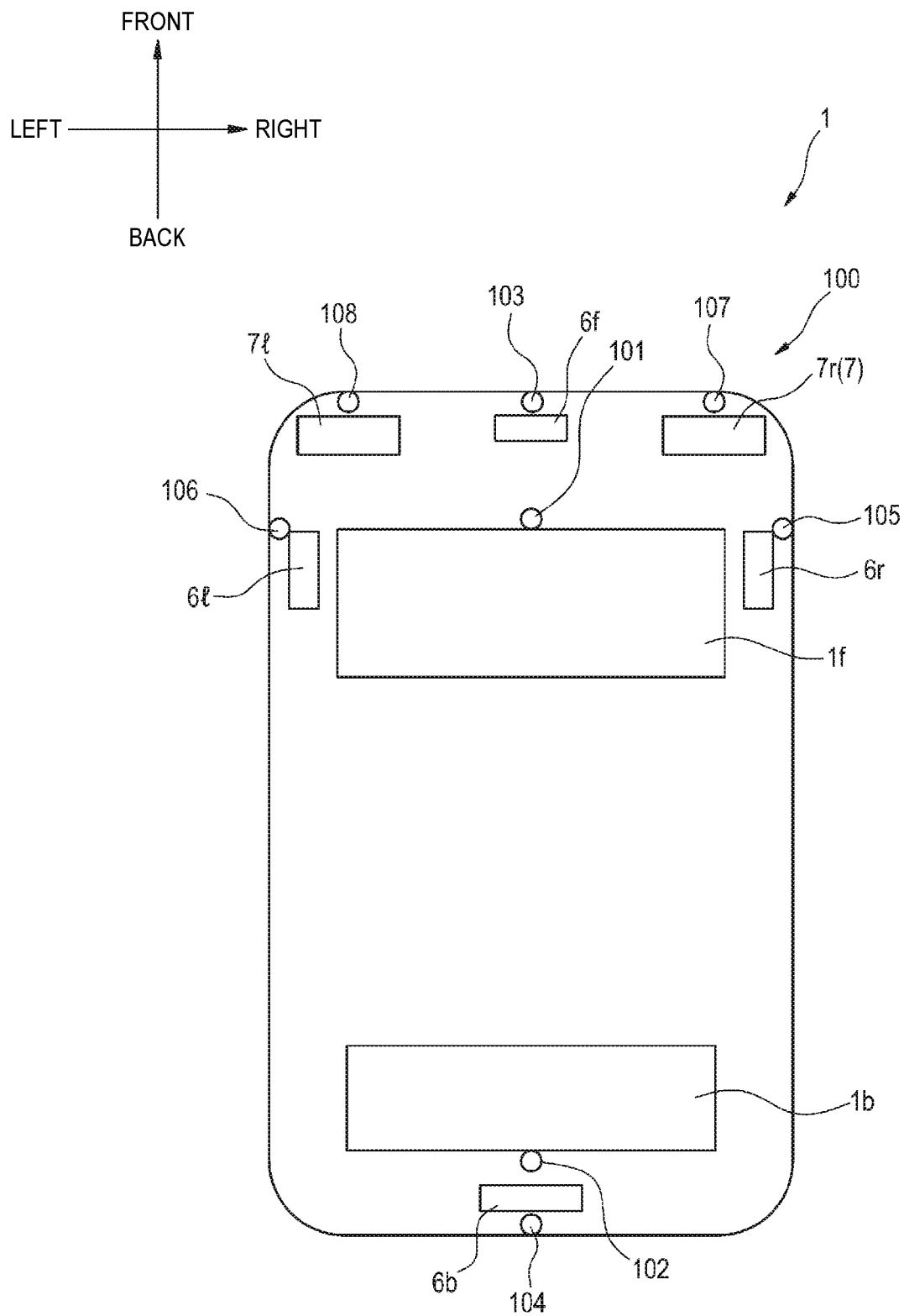
FIG. 1 is a top view of a vehicle which is mounted with a vehicle cleaner system.

Hereinafter, embodiments of the present invention will be described with reference to the drawings. Description of members having the same reference numerals as those already described in description of the present embodiment will be omitted for convenience of description. Dimensions of each member shown in the drawings may be different from actual dimensions of each member for convenience of description.

In the description of the present embodiment, "left-right direction", "front-rear direction", and "up-down direction" are appropriately referred to for convenience of description. These directions are relative directions set for a vehicle 1 shown in FIG. 1. Here, the "up-down direction" includes an "upward direction" and a "downward direction". The "front-rear direction" includes a "forward direction" and a "rearward direction". The "left-right direction" includes a "leftward direction" and a "rightward direction".

FIG. 1 is a top view of the vehicle 1 on which a vehicle cleaner system 100 according to the present embodiment (hereinafter, referred to as the cleaner system 100) is mounted. The vehicle 1 includes the cleaner system 100. In the present embodiment, the vehicle 1 is an automobile that can travel in an automatic driving mode.

Figure 2:
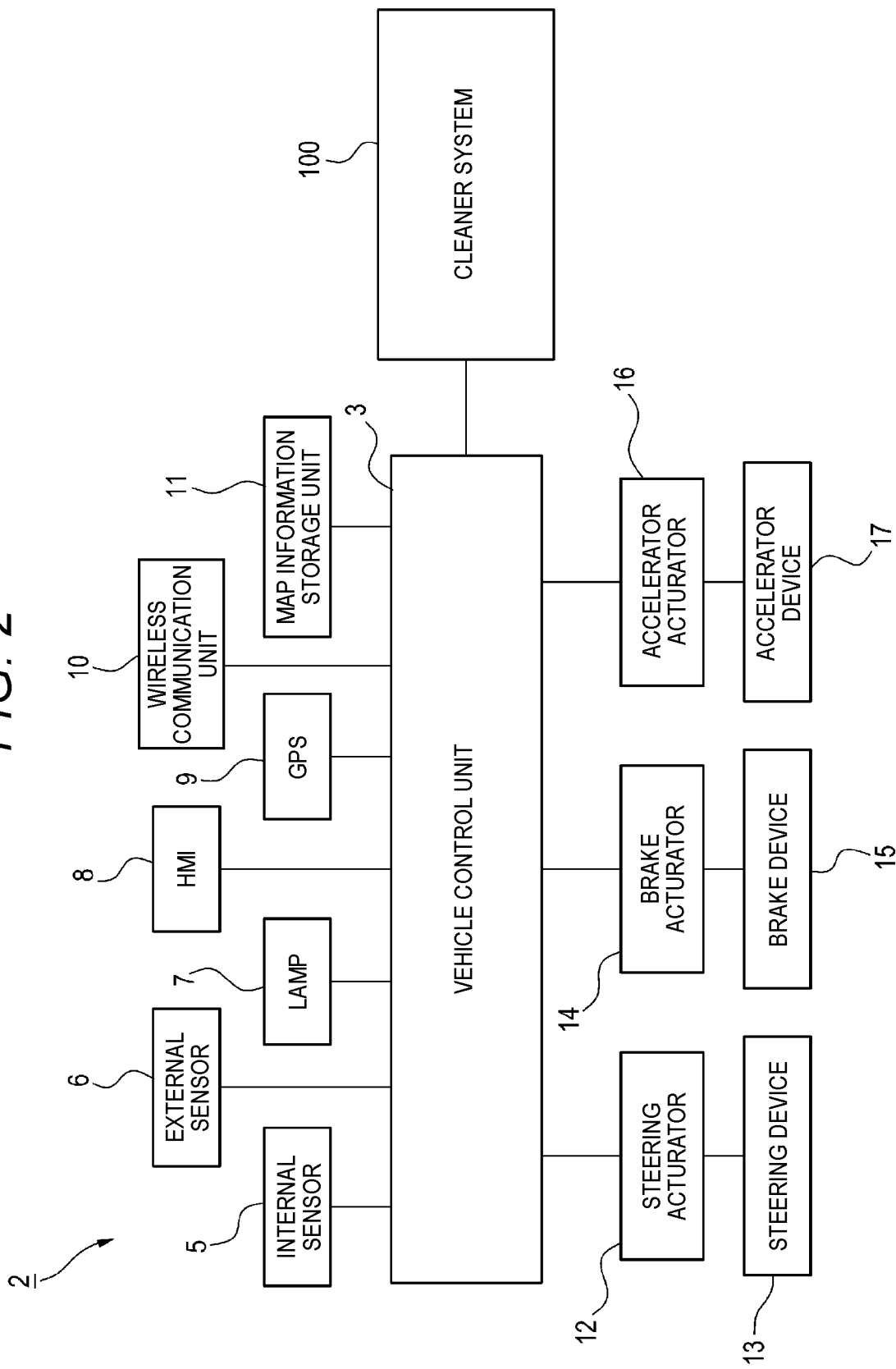
FIG. 2 is a block diagram of a vehicle system.

First, a vehicle system 2 of the vehicle 1 will be described with reference to FIG. 2. FIG. 2 shows a block diagram of the vehicle system 2. As shown in FIG. 2, the vehicle system 2 includes: a vehicle control unit 3; an internal sensor 5; an external sensor 6; a lamp 7; a human machine interface (HMI) 8; a global positioning system (GPS) 9; a wireless communication unit 10; and a map information storage unit 11. The vehicle system 2 further includes: a steering actuator 12; a steering device 13; a brake actuator 14; a brake device 15; an accelerator actuator 16; and an accelerator device 17.

The vehicle control unit 3 includes an electronic control unit (ECU). The vehicle control unit 3 includes: a processor, such as a central processing unit (CPU); a read-only memory (ROM), in which various vehicle control programs are stored; and a random access memory (RAM), in which various vehicle control data are temporarily stored. The processor loads a program designated from the various vehicle control programs stored in the ROM onto the RAM, and executes various processing in cooperation with the RAM. The vehicle control unit 3 controls traveling of the vehicle 1.

The internal sensor 5 is capable of acquiring information of the given vehicle. The internal sensor 5 is, for example, at least one of the following: an acceleration sensor, a speed sensor, a wheel speed sensor, or a gyro sensor. The internal sensor 5 acquires the information of the given vehicle, which includes a traveling state of the vehicle 1, and outputs the information to the vehicle control unit 3.

The internal sensor 5 may further include: a seating sensor which detects whether a driver is seated in a driver seat; a face direction sensor which detects a direction of a face of the driver; an outside weather sensor which detects outside weather conditions; and a human sensor which detects whether there is a person in the vehicle. Further, the internal sensor 5 may include an illuminance sensor which detects illuminance of a surrounding environment of the vehicle 1.

The external sensor 6 is capable of acquiring information on outside of the given vehicle. The external sensor is, for example, at least one of the following: camera, radar, LiDAR, or the like. The external sensor 6 acquires the information on the outside of the given vehicle, which includes the surrounding environment of the vehicle 1 (other vehicles, pedestrians, road shapes, traffic signs, obstacles, or the like) and outputs the information to the vehicle control unit 3.

The camera includes, for example, an imaging element such as a charge-coupled device (CCD) or a complementary MOS (CMOS). The camera is a camera which detects visible light or an infrared camera which detects infrared rays.

The radar is a millimeter-wave radar, a microwave radar, a laser radar, or the like.

LiDAR is an abbreviation for light detection and ranging or laser imaging detection and ranging. LiDAR is a sensor which generally emits invisible light forward and acquires information such as a distance to an object, a shape of the object, a material of the object, and a color of the object based on the emitted light and return light.

The lamp 7 is at least one of the following: a headlamp or a position lamp provided at a front portion of the vehicle 1; a rear combination lamp provided at a rear portion of the vehicle 1; a turn signal lamp provided at the front portion or a side portion of the vehicle; and various lamps which inform pedestrians or drivers of other vehicles of a situation of the given vehicle.

The HMI 8 includes an input unit which receives an input operation from a driver, and an output unit which outputs traveling information and the like to the driver. The input unit includes a steering wheel, an accelerator pedal, a brake pedal, a driving mode changeover switch which switches a driving mode of the vehicle 1, and the like. The output unit is a display which displays various types of traveling information.

The GPS 9 acquires current position information of the vehicle 1 and outputs the acquired current position information to the vehicle control unit 3. The wireless communication unit 10 receives traveling information of other vehicles around the vehicle 1 from the other vehicles and transmits the traveling information of the vehicle 1 to the other vehicles (vehicle-vehicle communication). The wireless communication unit 10 receives infrastructure information from infrastructure equipment such as a traffic light or a sign lamp and transmits the traveling information of the vehicle 1 to the infrastructure equipment (road-vehicle communication). The map information storage unit 11 is an external storage device such as a hard disk drive storing map information and is configured to output the map information to the vehicle control unit 3.

When the vehicle 1 travels in an automatic driving mode, the vehicle control unit 3 automatically generates, based on the traveling state information, the surrounding environment information, the current position information, the map information or the like, at least one of the following: a steering control signal, an accelerator control signal, or a brake control signal. The steering actuator 12 receives the steering control signal from the vehicle control unit 3 and control the steering device 13 based on the received steering control signal. The brake actuator 14 receives the brake control signal from the vehicle control unit 3 and control the brake device 15 based on the received brake control signal. The accelerator actuator 16 receives the accelerator control signal from the vehicle control unit 3 and control the accelerator device 17 based on the received accelerator control signal. In this way, the traveling of the vehicle 1 is automatically controlled by the vehicle system 2 in the automatic driving mode.

Meanwhile, when the vehicle 1 travels in a manual driving mode, the vehicle control unit 3 generates the steering control signal, the accelerator control signal, and the brake control signal according to a manual operation of the driver with respect to the accelerator pedal, the brake pedal, and the steering wheel. In this way, in the manual driving mode, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the automatic driving mode and the manual driving mode. The automatic driving mode includes a fully automatic driving mode, an advanced driving assistance mode, and a driving assistance mode. In the fully automatic driving mode, the vehicle system 2 automatically perform all traveling control, including steering control, brake control, and accelerator control, and the driver cannot drive the vehicle 1. In the advanced driving assistance mode, the vehicle system 2 automatically performs all the traveling control including the steering control, the brake control, and the accelerator control, and the driver does not drive the vehicle 1 while the driver is capable of driving the vehicle 1. In the driving assistance mode, the vehicle system 2 automatically performs a part of the traveling control including the steering control, the brake control, and the accelerator control, and the driver drives the vehicle 1 under driving assistance of the vehicle system 2. Meanwhile, in the manual driving mode, the vehicle system 2 does not automatically perform the traveling control, and the driver drives the vehicle 1 without the driving assistance of the vehicle system 2.

The driving mode of the vehicle 1 may be switched by operating the driving mode changeover switch. In this case, the vehicle control unit 3 switches the driving mode of the vehicle 1 between the four driving modes (the fully automatic driving mode, the advanced driving assistance mode, the driving assistance mode, and the manual driving mode) according to an operation of the driver on the driving mode changeover switch. The driving mode of the vehicle 1 may be automatically switched based on information on a travelable section where an automatic driving vehicle can travel and a traveling prohibited section where the traveling of the automatic driving vehicle is prohibited or information on the external weather conditions. In this case, the vehicle control unit 3 switches the driving mode of the vehicle 1 based on these types of information. Further, the driving mode of the vehicle 1 may be automatically switched by using the seating sensor, the face direction sensor, or the like. In this case, the vehicle control unit 3 switches the driving mode of the vehicle 1 based on an output signal from the seating sensor or the face direction sensor.

Referring back to FIG. 1, the vehicle 1 includes, as the external sensor 6, a front LiDAR 6*f*, a rear LiDAR 6*b*, a right LiDAR 6*r*, and a left LiDAR 6*l*. The front LiDAR 6*f* acquires information in front of the vehicle 1. The rear LiDAR 6*b* acquires information behind the vehicle 1. The right LiDAR 6*r* acquires information on a right side of the vehicle 1. The left LiDAR 6*l* acquires information on a left side of the vehicle 1.

Although in the example shown in FIG. 1, the front LiDAR 6*f* is provided at the front portion of the vehicle 1, the rear LiDAR 6*b* is provided at the rear portion of the vehicle 1, the right LiDAR 6*r* is provided at a right portion of the vehicle 1, and the left LiDAR 6*l* is provided at a left portion of the vehicle 1, the present invention is not limited thereto. For example, the front LiDAR, the rear LiDAR, the right LiDAR, and the left LiDAR may be collectively arranged at a ceiling portion of the vehicle 1.

The vehicle 1 includes a right headlamp 7*r* and a left headlamp 7*l* as the lamp 7. The right headlamp 7*r* is provided at a right-front portion of the vehicle 1, and the left headlamp 7*l* is provided at a left-front portion of the vehicle 1. The right headlamp 7*r* is provided on a right side of the left headlamp 7*l*.

The vehicle 1 includes a front window 1*f* and a rear window 1*b* as window shields.

The vehicle 1 includes the cleaner system 100. The cleaner system 100 cleans cleaning target objects provided outside a vehicle compartment, that is, uses a cleaning medium to remove foreign substances such as water droplets, mud, dust, and the like adhering to the cleaning target objects. In the present embodiment, the cleaner system 100 includes: a front window washer nozzle (hereinafter referred to as front WW nozzle) 101; a rear window washer nozzle (hereinafter referred to as rear WW nozzle) 102; a front LiDAR cleaner nozzle (hereinafter referred to as front LC nozzle) 103; a rear LiDAR cleaner nozzle (hereinafter referred to as rear LC nozzle) 104; a right LiDAR cleaner nozzle (hereinafter referred to as right LC nozzle) 105; a left LiDAR cleaner nozzle (hereinafter referred to as left LC nozzle) 106; a right headlamp cleaner nozzle (hereinafter referred to as right HC nozzle) 107; and a left headlamp cleaner nozzle (hereinafter referred to as left HC nozzle) 108.

The front WW nozzle 101 can be used to clean the front window 1*f*. The rear WW nozzle 102 can be used to clean the rear window 1*b*. The front LC nozzle 103 can clean the front LiDAR 6*f*. The rear LC nozzle 104 can clean the rear LiDAR 6*b*. The right LC nozzle 105 can clean the right LiDAR 6*r*. The left LC nozzle 106 can clean the left LiDAR 6*l*. The right HC nozzle 107 can clean the right headlamp 7*r*. The left HC nozzle 108 can clean the left headlamp 7*l*.

Figure 3:
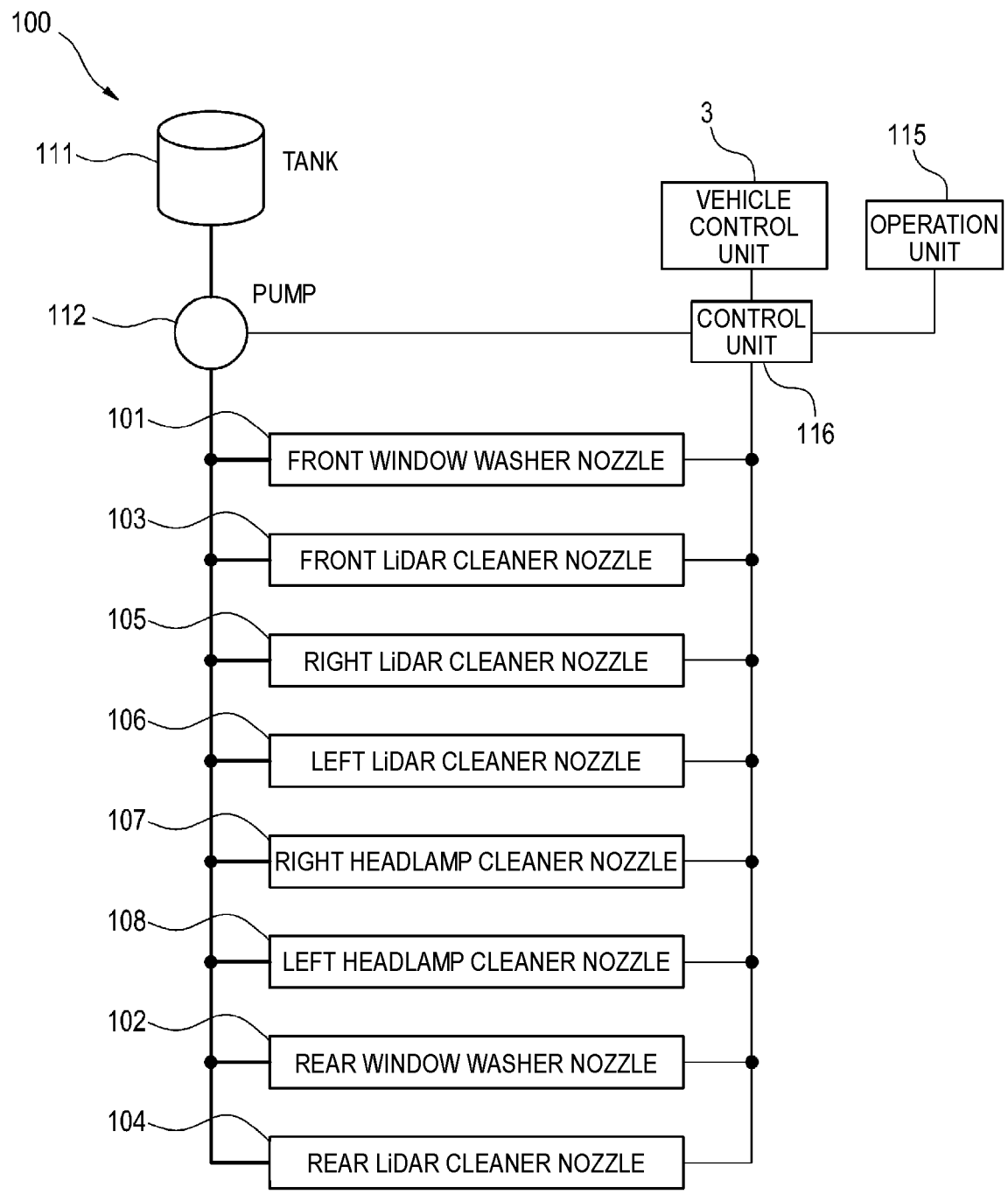
FIG. 3 is a block diagram of a vehicle cleaner system.

FIG. 3 is a block diagram of the cleaner system 100. In addition to the nozzles 101 to 108, the cleaner system 100 includes a tank 111, a pump 112 (an example of a single pump), an operation unit 115, and a control unit 116 (an example of a cleaner control unit). In the present embodiment, each of the nozzles 101 to 108 can discharge cleaning liquid toward the cleaning target objects.

The nozzles 101 to 108 are connected to the tank 111 via the pump 112. The pump 112 sends the cleaning liquid stored in the tank 111 to the nozzles 101 to 108, respectively.

The operation unit 115 is a device which can be operated by a user of the vehicle 1. The operation unit 115 outputs a signal in accordance with the operation of the user, and the signal is input to the control unit 116. For example, the operation unit 115 can be configured by a switch or the like provided in the vehicle compartment.

Each of the nozzles 101 to 108 is provided with an actuator which opens the nozzle and discharges the cleaning liquid to the cleaning target object. The actuators provided in the nozzles 101 to 108 are electrically connected to the control unit 116. The control unit 116 is also electrically connected to the pump 112, the operation unit 115, and the vehicle control unit 3.

For example, when a signal for cleaning the front window 1*f* is input to the control unit 116, the control unit 116 operates the pump 112 to send the cleaning liquid from the tank 111 to the front WW nozzle 101, and operates the actuator of the front WW nozzle 101 to discharge the cleaning liquid from the front WW nozzle 101.

In the present embodiment, the control unit 116 can operate the nozzles 101 to 108 such that cleaning methods of the nozzles 101 to 108 (a plurality of cleaners configured to clean different cleaning target objects) are different from each other. Methods of differentiating the cleaning methods of the nozzles 101 to 108 by control of the control unit 116 will be described below as exemplified in first to fourth embodiments.

First Embodiment

Figure 4:
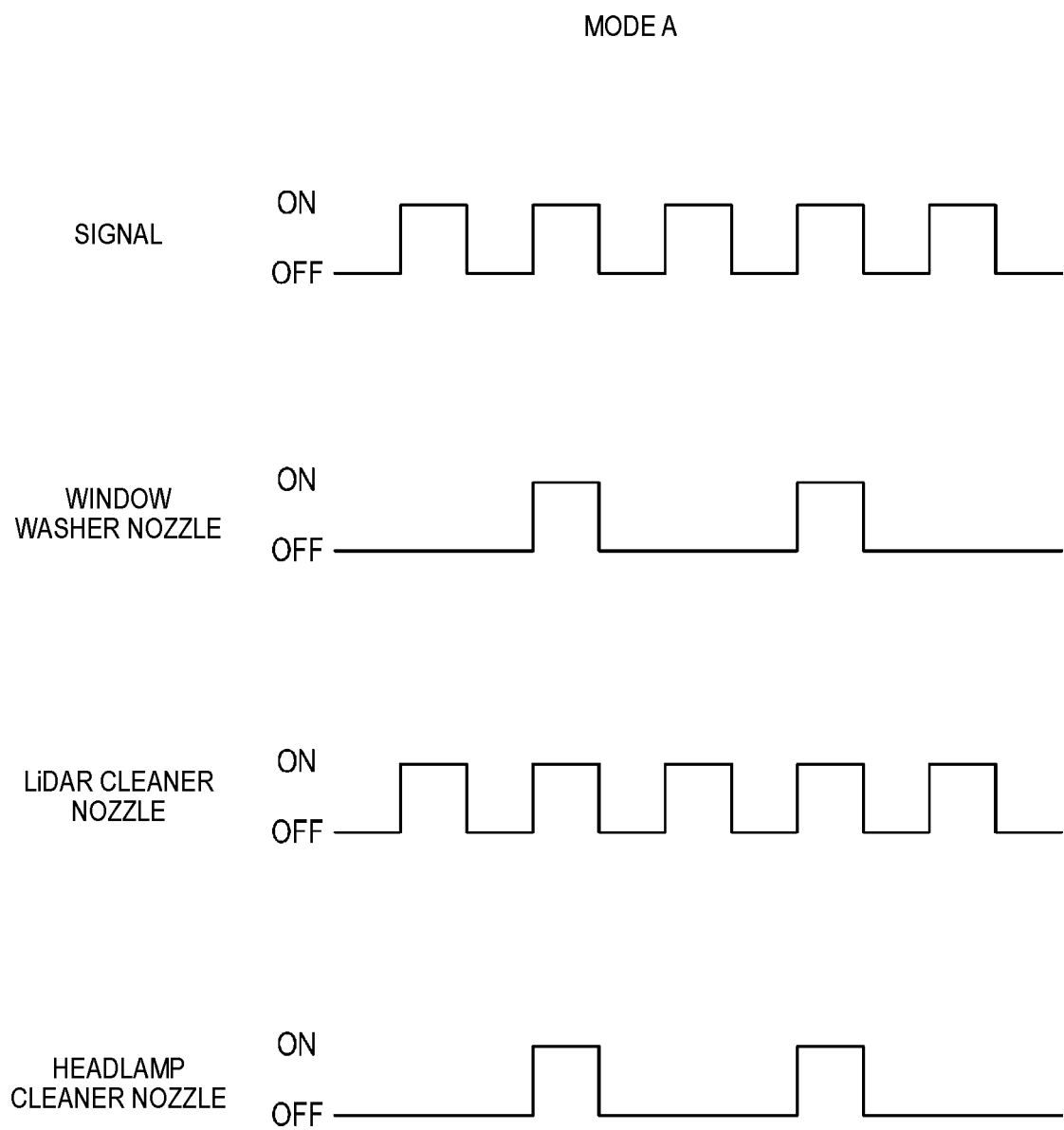
FIG. 4 is a timing chart showing an operation according to a first embodiment of the vehicle cleaner system.

FIG. 4 is a timing chart showing an operation (operation mode A) according to the first embodiment of the cleaner system 100.

When the signal for cleaning the front window 1f is input to the control unit 116, the control unit 116 operates the pump 112 to send the cleaning liquid from the tank 111 to the front WW nozzle 101, and operates the actuator of the front WW nozzle 101 to discharge the cleaning liquid from the front WW nozzle 101. The cleaning liquid is sent from the tank 111 to the LC nozzles 103 to 105 and the HC nozzles 107 and 108, and the actuators of the nozzles 103 to 108 are operated to discharge the cleaning liquid from the nozzles 103 to 108. That is, the control unit 116 discharges the cleaning liquid from the LC nozzles 103 to 106 and the HC nozzles 107 and 108 in conjunction with the discharge of the cleaning liquid from the front WW nozzle 101. When the signal for cleaning the front window 1f is input, the control unit 116 may also discharge the cleaning liquid from the rear WW nozzle 102 together with the front WW nozzle 101. At this time, the control unit 116 operates the actuators of the respective nozzles such that the number of times of operations of the nozzles 101 to 108 with respect to the number of times of input operation signal (number of times of input) differs from each other depending on types of the cleaning target objects.

For example, the operation mode A shown in FIG. 4 is suitable for a case where the vehicle is driven in the fully automatic driving mode or the advanced driving assistance mode in the automatic driving mode. In this case, the control unit 116 controls operation of the actuators of the nozzles such that the number of times of operations of the LC nozzles 103 to 106 is larger than the number of times of operations of the WW nozzles 101 and 102 or the HC nozzles 107 to 108 with respect to the input of the operation signal. Specifically, for example, the control unit 116 operates the actuators of the LC nozzles 103 to 106 four times for every four operation signals, while the actuators of the WW nozzles 101 and 102 and the HC nozzles 107 and 108 are operated twice for every four operation signals. This operation mode A is particularly suitable for a case where the vehicle is driven automatically and surroundings of the vehicle are bright (daytime).

When the vehicle is driven in the fully automatic driving mode or the advanced driving assistance mode, it is important to maintain cleanliness of the LiDARs 6f, 6b, 6r, and 6l, so that sensitivity of these sensors is not reduced. Meanwhile, capacity of the tank 111 is limited, thus it is required to minimize an amount of the cleaning liquid used. Therefore, in the first embodiment, the number of times of operations of the LC nozzles 103 to 106 is controlled to be larger than the number of times of operations of the WW nozzles 101 and 102, and the HC nozzles 107 and 108, so that the cleaning liquid is saved while the sensitivity of the LiDARs 6f, 6b, 6r, and 6l can be maintained, as compared with a case where the WW nozzles 101 and 101, the LC nozzles 103 to 106, and the HC nozzles 107 and 108 are operated with the same number of times of operations.

In the present embodiment, the number of times of operations of the LC nozzles 103 to 106 may be controlled to be larger than the number of times of operations of the WW nozzles 101 and 102 or the HC nozzles 107 and 108, and the number of times of operations of each nozzle with respect to the input of the operation signal is not limited to the example shown in FIG. 4. For example, the number of times of operations of the WW nozzles 101 and 102 may be different from that of the HC nozzles 107 and 108. When the vehicle is operated in the automatic driving mode (fully automatic driving mode and advanced driving assistance mode) and surroundings of the vehicle are dark (nighttime), sensitivity of LiDAR (for example, LiDARs 6f, 6r, and 6l) needs to be maintained by lighting of the left and right headlamps 7r and 7l. For this reason, relatively high cleanliness is required for the left and right headlamps 7r and 7l. Therefore, in this case, the number of times of operations of the HC nozzles 107 and 108 is preferably larger than the number of times of operations of the WW nozzles 101 and 102. The number of times of operations of the front WW nozzle 101 and the number of times of operations of the rear WW nozzle 102 may be different, and it is possible that only one of the WW nozzles 101 and 102 is operated with respect to the input of the operation signal.

Second Embodiment

Figure 5:
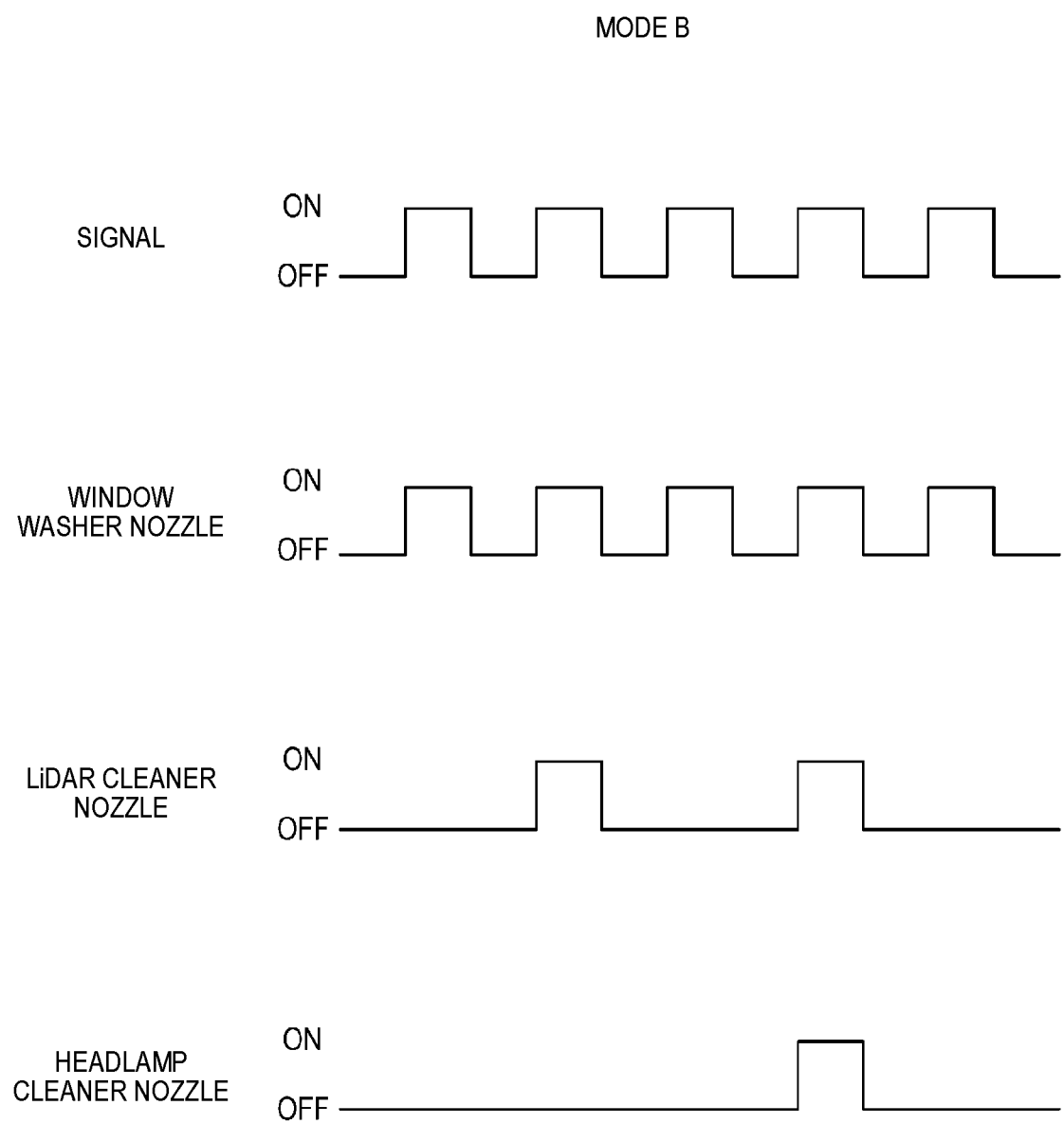
FIG. 5 is a timing chart showing an operation according to a second embodiment of the vehicle cleaner system.

FIG. 5 is a timing chart showing an operation (operation mode B) according to a second embodiment of the cleaner system 100. For example, the operation mode B shown in FIG. 5 is suitable for a case where the vehicle is driven in the driving assistance mode. In this case, the control unit 116 controls the operation of the actuators of the nozzles such that the number of times of operations of the WW nozzles 101 and 102 is larger than the number of times of operations of the LC nozzles 103 to 106, and the number of times of operations of the LC nozzles 103 to 106 is larger than the number of times of operations of the HC nozzles 107 and 108. Specifically, for example, the control unit 116 operates the actuators of the WW nozzles 101 and 102 four times for every four operation signals, operates the actuators of the LC nozzles 103 to 106 twice for every four operation signals, and operates the actuators of the HC nozzles 107 and 108 once for every four signals.

When the vehicle is driven in the driving assistance mode, it is important to maintain cleanliness of the front window 1f and the rear window 1b, so as to maintain good front view and rear view for the driver. It is also required to maintain the sensitivity of each of the LiDARs 6f, 6b, 6r and 6l while ensuring the view of the driver. For this reason, by setting the number of times of operations as in the example shown in FIG. 5, the cleanliness of the front window 1f and the rear window 1b and the sensitivity of the LiDARs 6f, 6b, 6r and 6l can be maintained while saving the cleaning liquid.

Third Embodiment

Figure 6:
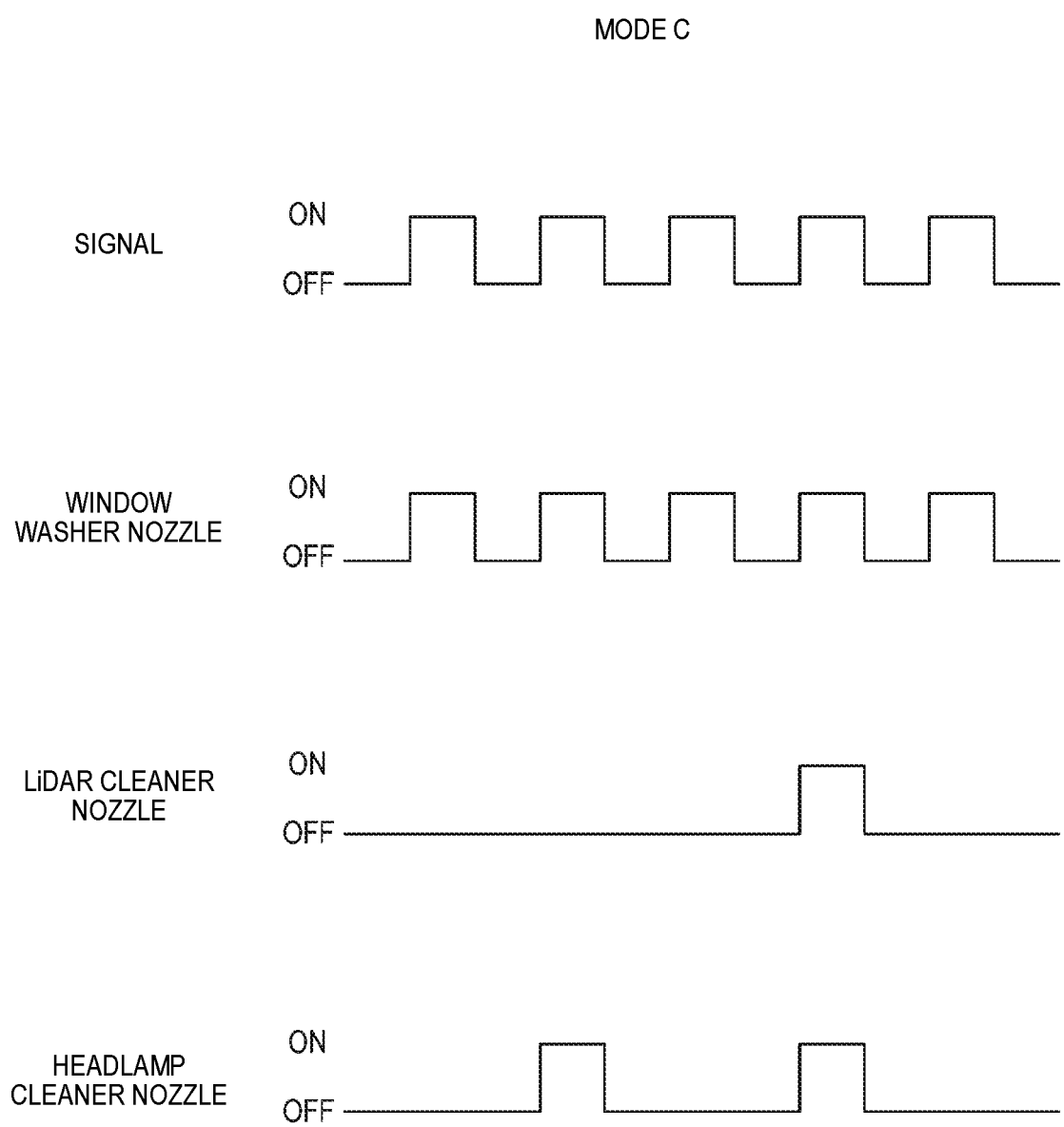
FIG. 6 is a timing chart showing an operation according to a third embodiment of the vehicle cleaner system.

FIG. 6 is a timing chart showing an operation (operation mode C) according to a third embodiment of the cleaner system 100. For example, the operation mode C shown in FIG. 6 is suitable for a case where the vehicle is driven in the manual driving mode during daytime. In this case, the control unit 116 controls the operation of the actuators of the nozzles such that the number of times of operations of the WW nozzles 101 and 102 is larger than the number of times of operations of the HC nozzles 107 and 108, and the number of times of operations of the HC nozzles 107 and 108 is larger than the number of times of operations of the LC nozzles 103 to 106. Specifically, for example, the control unit 116 operates the actuators of the WW nozzles 101 and 102 four times for every four operation signals, operates the actuators of the HC nozzles 107 and 108 twice for every four operation signals, and operates the actuators of the LC nozzles 103 to 106 once for every four signals.

When the vehicle is driven in the manual driving mode during daytime, it is important to maintain the cleanliness of the front window 1f and the rear window 1b, so as to maintain good front view and rear view for the driver. Meanwhile, it is not necessary to maintain illuminance of light emitted from the left and right headlamps 7r and 7l, and it is not necessary to acquire the information on the outside of the vehicle by the LiDARs 6f, 6b, 6r and 6l. For this reason, in the second embodiment, by setting the number of times of operations as in FIG. 6, cleanliness of the front window 1f, the rear window 1b and the left and right headlamps 7r and 7l can be maintained while saving the cleaning liquid.

In the present embodiment, the number of times of operations of the WW nozzles 101 and 102 may be controlled to be larger than the number of times of operations of the LC nozzles 103 to 106 or the HC nozzles 107 and 108, and the number of times of operations of each nozzle with respect to the input of the operation signal is not limited to the example shown in FIG. 6. For example, the number of times of operations of the LC nozzles 103 to 106 and the number of times of operations of the HC nozzles 107 and 108 may be the same.

Fourth Embodiment

Figure 7:
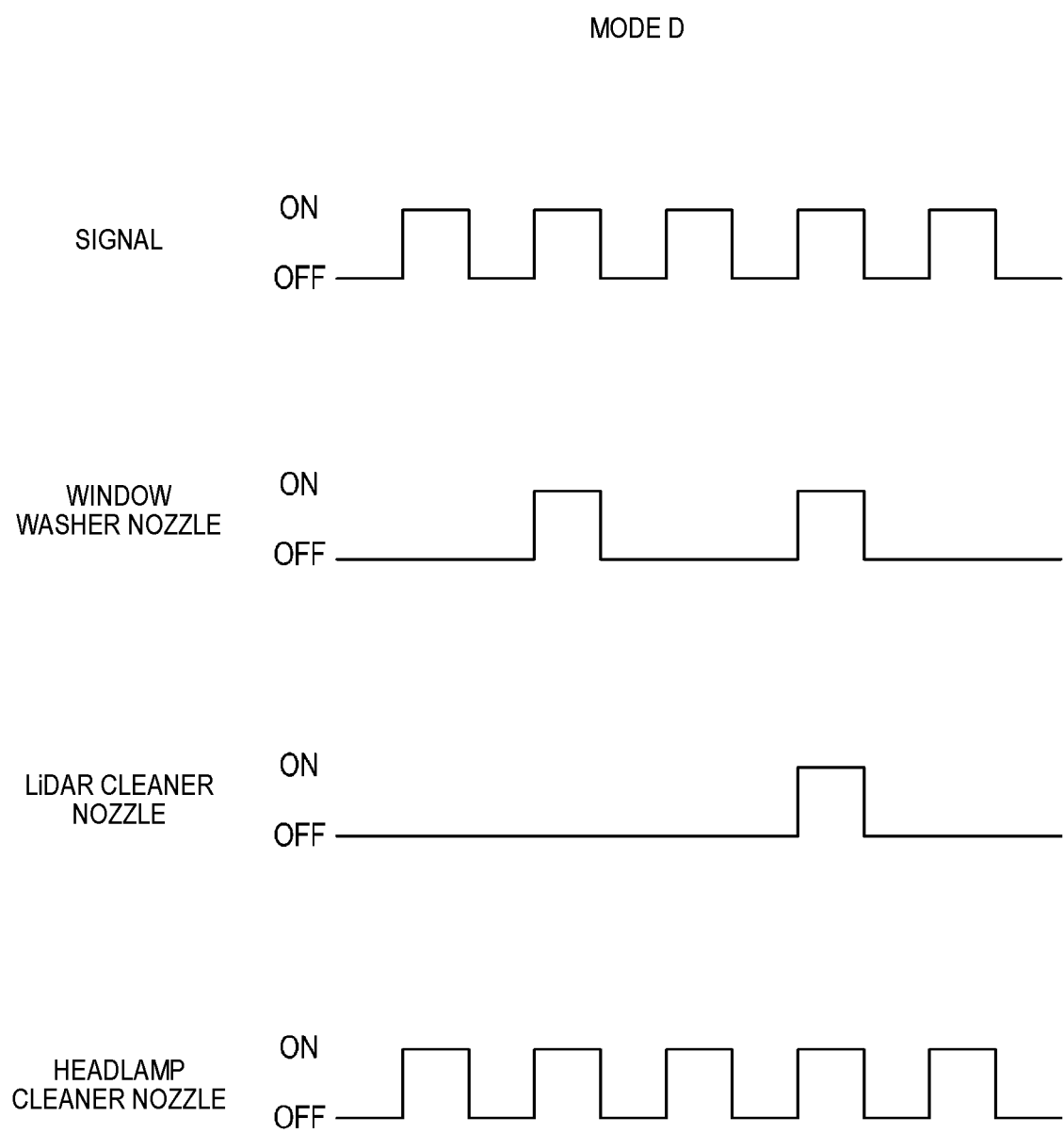
FIG. 7 is a timing chart showing an operation according to a fourth embodiment of the vehicle cleaner system.

FIG. 7 is a timing chart showing an operation (operation mode D) according to a fourth embodiment of the cleaner system 100. For example, the operation mode D shown in FIG. 7 is suitable for a case where the vehicle is driven in the manual driving mode during nighttime. In this case, the control unit 116 controls the operation of the actuators of the nozzles such that the number of times of operations of the HC nozzles 107 and 108 is larger than the number of times of operations of the WW nozzles 101 and 102, and the number of times of operations of the WW nozzles 101 and 102 is larger than the number of times of operations of the LC nozzles 103 to 106. Specifically, for example, the control unit 116 operates the actuators of the HC nozzles 107 and 108 four times for every four operation signals, operates the actuators of the WW nozzles 101 and 102 twice for every four operation signals, and operates the actuators of the LC nozzles 103 to 106 once for every four signals.

When the vehicle is driven in the manual driving mode during nighttime, the illuminance of the light emitted from the left and right headlamps 7r and 7l is most preferentially maintained, so as to maintain a good front view of the vehicle. It is also required to maintain the cleanliness of the front window 1f and the rear window 1b so as to allow the driver to visually recognize the front view illuminated by the left and right headlamps 7r and 7l. Meanwhile, it is not necessary to acquire the information on the outside of the vehicle by the LiDARs 6f, 6b, 6r and 6l. For this reason, in the second embodiment, by setting the number of times of operations as in FIG. 7, the cleanliness of the left and right headlamps 7r and 7l and the front window 1f can be maintained while saving the cleaning liquid.

As described in the first to fourth embodiments, in the cleaner system 100, the control unit 116 can change the magnitude relationship between the number of times of operations of the WW nozzles 101 and 102, the number of times of operations of the LC nozzles 103 to 106, and the number of times of operations of the HC nozzles 107 and 108. That is, in the present cleaner system 100, a suitable magnitude relationship can be selected between the number of times of operations of the LC nozzles 103 to 106 and the number of times of operations of the WW nozzles 101 and 102 and/or the HC nozzles 107 and 108 corresponding to the plurality of operation modes. In this way, since the present cleaner system 100 can be operated to suit various scenes, usability of the present cleaner system 100 is improved. Since the cleaning liquid can be discharged to the WW nozzles 101 and 102, the LC nozzles 103 to 106, and the HC nozzles 107 and 108, which have different cleaning target objects, by the single tank 111 and the single pump 112, the system can be simplified and the cost can be reduced.

The method for differentiating the cleaning methods of the nozzles 101 to 108 is not limited to the method of differentiating the number of times of operations of the nozzles 101 to 108 as described in the first to fourth embodiments. For example, the control unit 116 may also differente a spray time, spray amount, spray pressure, spray area, and the like of the cleaning medium in the nozzles 101 to 108. Specifically, for example, the control unit 116 sets spray pressures of the cleaning medium at the front LC nozzle 103, the rear LC nozzle 104, the right LC nozzle 105, and the left LC nozzle 106 to be higher than spray pressures of the cleaning medium at the right HC nozzle 107 and the left HC nozzle 108. In the case of the automatic driving mode, the LiDARs 6f, 6b, 6r and 6l are required to have higher cleanliness than the left and right headlamps 7r and 7l. For this reason, it is preferable to spray the cleaning liquid at a higher pressure on the LiDARs 6f, 6b, 6r, and 6l to perform cleaning.

Fifth Embodiment

The method for differentiating the cleaning methods of the nozzles 101 to 108 is not limited to the method of differentiating the cleaning methods by the control of the control unit 116 as described in the above embodiments. As another example of the method for differentiating the cleaning methods from each other, a method of differentiating methods of spraying the cleaning liquid from the nozzle will be described below with reference to FIGS. 8 to 10.

Figure 8:
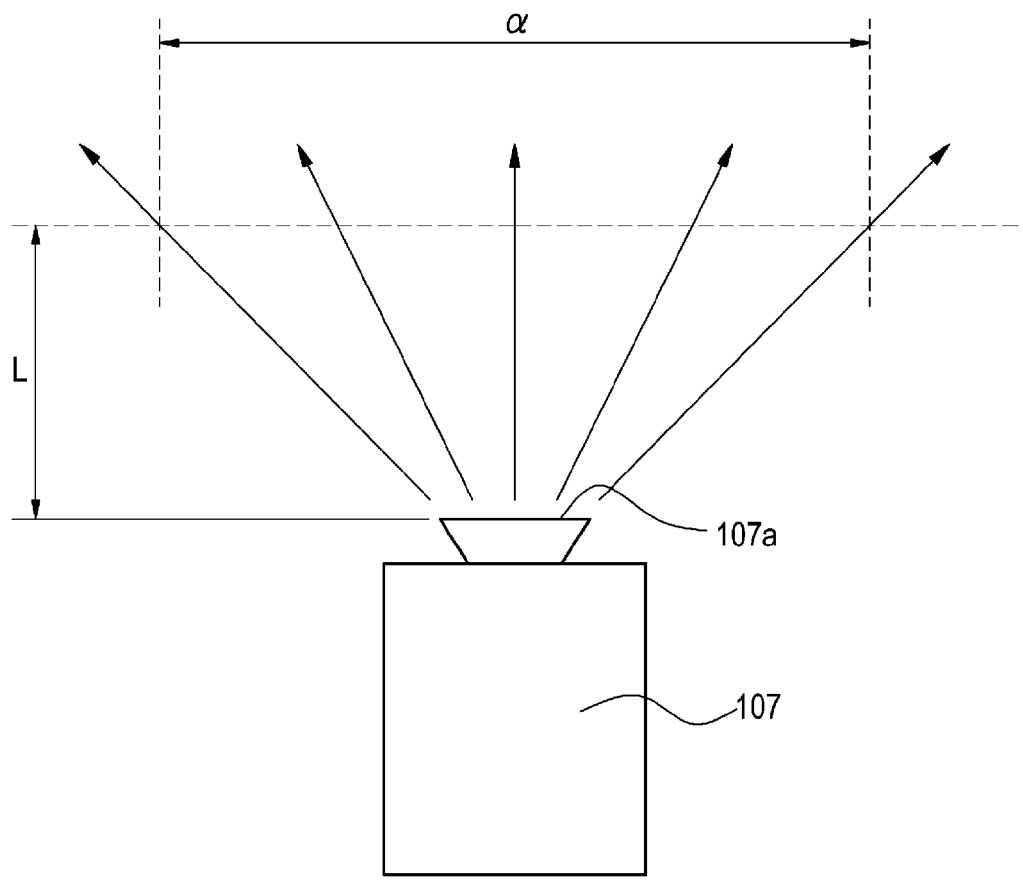
FIG. 8 is a schematic view showing a method of spraying cleaning liquid by a cleaner nozzle included in the vehicle cleaner system according to a fifth embodiment.
Figure 9:
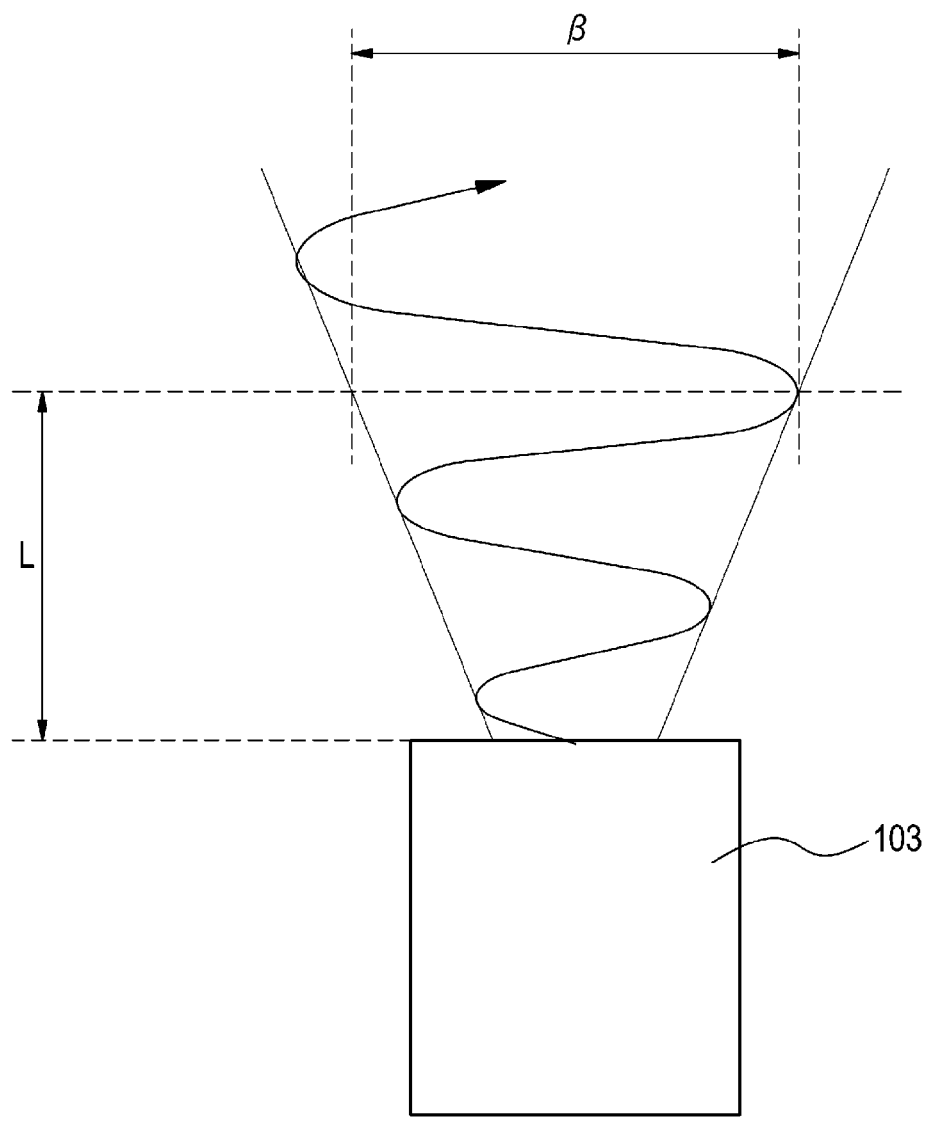
FIG. 9 is a schematic view showing the method of spraying the cleaning liquid by the cleaner nozzle included in the vehicle cleaner system according to the fifth embodiment.

FIGS. 8 and 9 are schematic views showing a method of spraying the cleaning liquid from a cleaner nozzle included in the cleaner system 100. FIG. 8 shows a spray method of the HC nozzle, and FIG. 9 shows a spray method of the LC nozzle. In FIG. 8, among the HC nozzles 107 and 108, the right HC nozzle 107 is shown. In FIG. 9, among the LCs 103 to 106, the front LC nozzle 103 is shown.

As shown in FIG. 8, for example, the right HC nozzle 107 includes a substantially fan-shaped opening portion 107a. The cleaning liquid is radially sprayed from the opening portion 107a. Here, a spray width of the cleaning liquid at a distance L (mm) from the opening portion 107a to a predetermined position in a spray direction of the cleaning liquid is set to α (mm).

Meanwhile, the front LC nozzle 103 shown in FIG. 9 is configured as a fluidics type nozzle (diffusion spray nozzle). The fluidics type nozzle is a nozzle which performs control to interfere with a flow of fluid and deflect a direction thereof. As shown in FIG. 9, the front LC nozzle 103, as the fluidics type nozzle, can change a spray direction of the cleaning liquid leftward and rightward by deflecting a flow path of the cleaning liquid.

Figure 10:
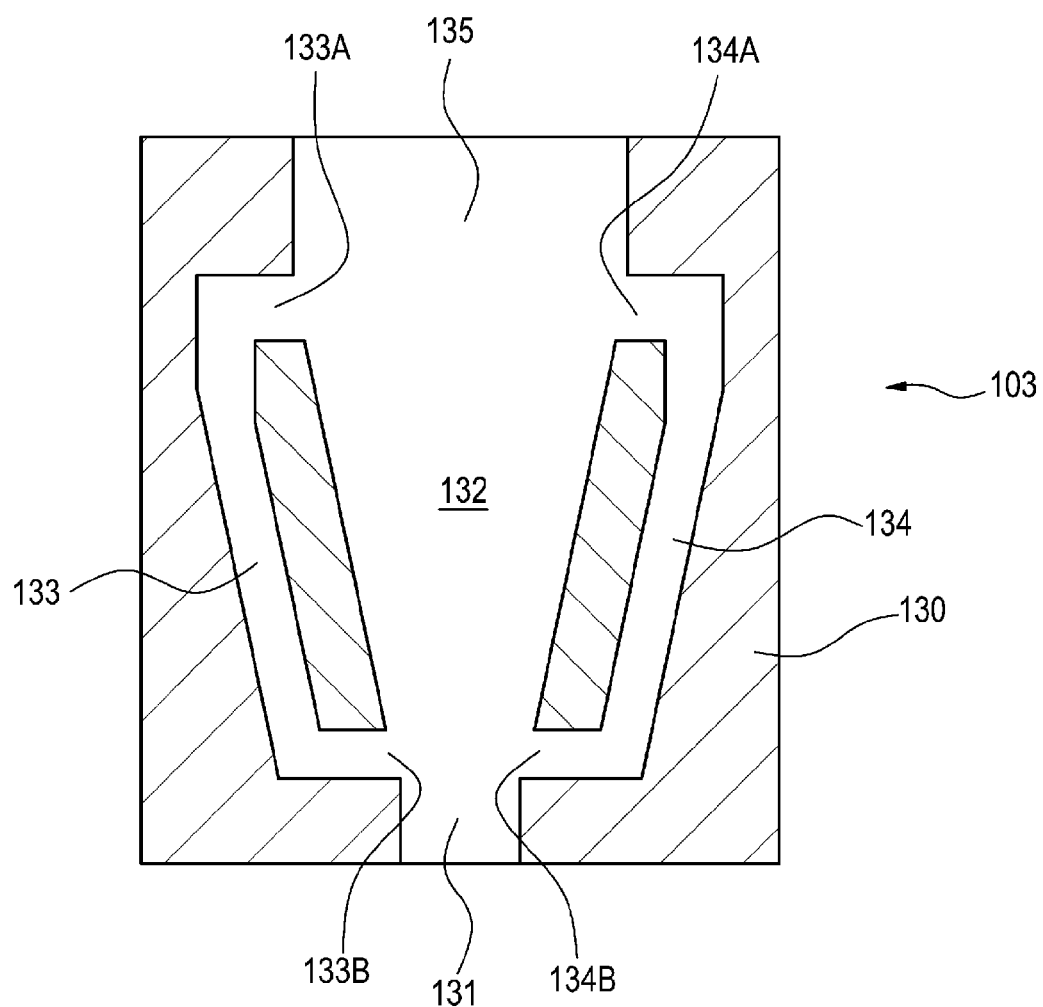
FIG. 10 is a cross-sectional view showing an internal structure of the cleaner nozzle shown in FIG. 9.

Specifically, as shown in FIG. 10, the front LC nozzle 103 includes a configuration which serves as a nozzle tip (diffusion fluid element) 130 therein. The nozzle tip 130 is formed with a flow path 131, an oscillation chamber 132, a pair of feedback flow paths 133 and 134, and a diffusion spray opening 135. The oscillation chamber 132 is continuously formed in the flow path 131, and is supplied with the cleaning liquid from the flow path 131. The pair of feedback flow paths 133 and 134 is provided on left and right sides of the oscillation chamber 132, respectively. The feedback flow paths 133 and 134 include: inlets 133A and 134A which are opened to the oscillation chamber 132 on an outlet side of the oscillation chamber 132; and outlets 133B and 134B which are opened to the oscillation chamber 132 on an inlet side of the oscillation chamber 132. Accordingly, the feedback flow paths 133 and 134 branch and guide a part of the cleaning liquid supplied from the flow path 131 to the oscillation chamber 132 from the respective inlets 133A and 134A to the respective outlets 133B and 134B, and then return the same to the oscillation chamber 132. That is, the cleaning liquid is fed back and flowed through the feedback flow paths 133 and 134. Accordingly, the cleaning liquid guided to the feedback flow paths 133 and 134 becomes so-called "feedback control flows", the cleaning liquid flowing in the oscillation chamber 132 can be self-excited to oscillate, and the cleaning liquid can be oscillated leftward and rightward to be diffused and sprayed from the diffusion spray opening 135. In this way, since the front LC nozzle 103 includes the fluidics type nozzle tip 130, the cleaning liquid can be sprayed to the LiDAR 6f at a high pressure while being oscillated leftward and rightward.

Here, as shown in FIG. 9, a spray width of the cleaning liquid at the distance L (mm) from the diffusion spray opening 135 to a predetermined position in the spray direction of the cleaning liquid is set to β (mm). The spray width P of the front LC nozzle 103 is preferably set to be shorter than the spray width a of the right HC nozzle 107. Accordingly, the front LC nozzle 103 can spray the cleaning liquid at a higher pressure than the right HC nozzle 107.

Sixth Embodiment

Figure 11:
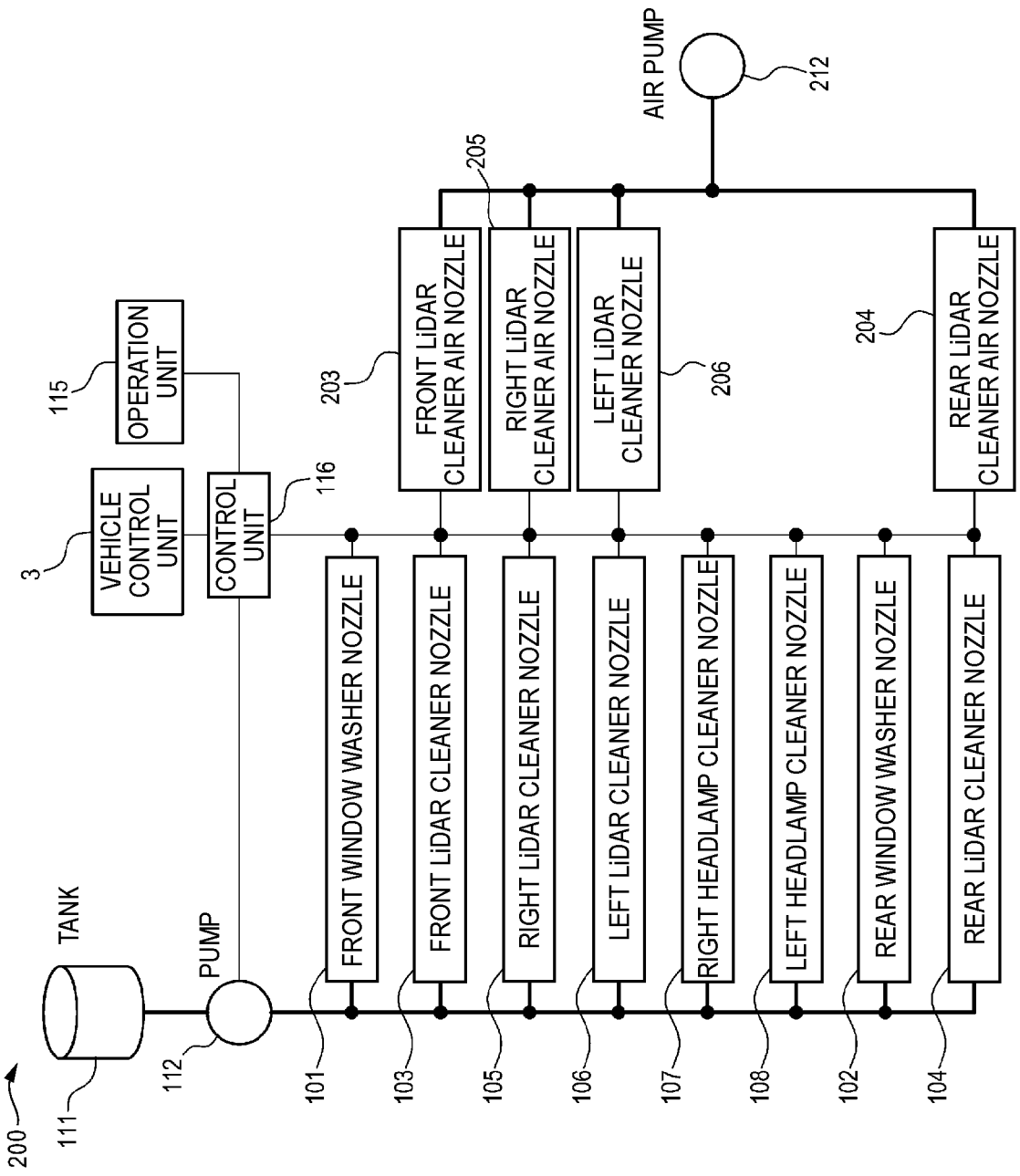
FIG. 11 is a block diagram according to a sixth embodiment of the vehicle cleaner system.

FIG. 11 is a block diagram of a cleaner system 200 according to a sixth embodiment. The cleaner system 200 includes, in addition to the nozzles 101 to 108, the tank 111, the pump 112, and the like, a front LiDAR cleaner air nozzle 203 (hereinafter, referred to as the front LC air nozzle 203), a rear LiDAR cleaner air nozzle 204 (hereinafter, referred to as the rear LC air nozzle 204), a right LiDAR cleaner air nozzle 205 (hereinafter, referred to as the right LC air nozzle 205), a left LiDAR cleaner air nozzle 206 (hereinafter, referred to as the left LC air nozzle 206), and an air pump 212.

The front LC air nozzle 203, the rear LC air nozzle 204, the right LC air nozzle 205, and the left LC air nozzle 206 are connected to the compressed air generating device 212. The compressed air generating device 212 compresses air taken from the outside, and sends the compressed air to each of the LC air nozzles 203 to 206.

The front LC air nozzle 203 is provided in the vicinity of the front LC nozzle 103, and is capable of spraying the compressed air toward the front LiDAR 6f. The rear LC air nozzle 204 is provided in the vicinity of the rear LC nozzle 104, and is capable of spraying the compressed air toward the rear LiDAR 6b. The right LC air nozzle 205 is provided in the vicinity of the right LC nozzle 105, and is capable of spraying the compressed air toward the right LiDAR 6r. The left LC air nozzle 206 is provided in the vicinity of the left LC nozzle 106, and is capable of spraying the compressed air toward the left LiDAR 6l.

Figure 12:
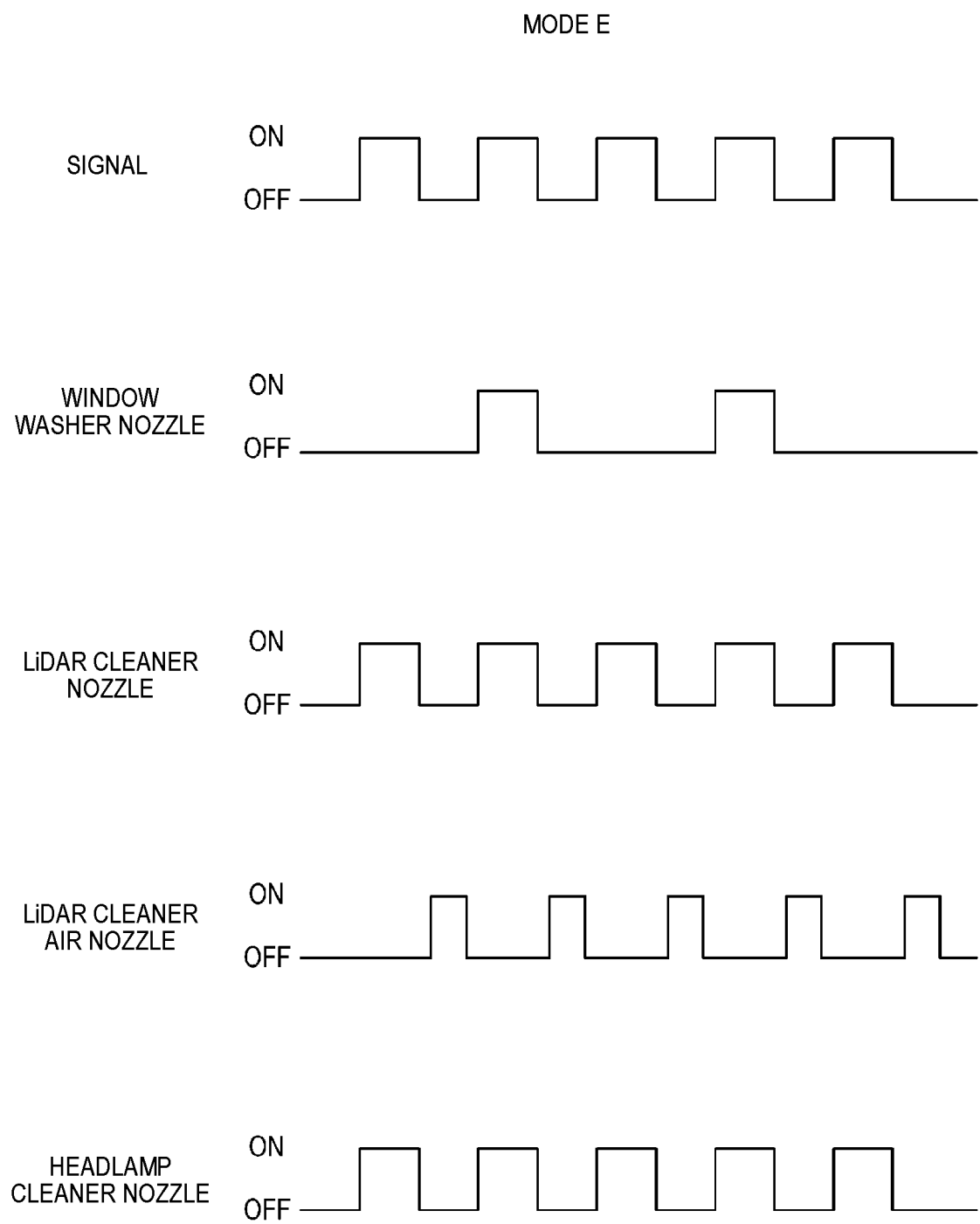
FIG. 12 is a timing chart showing an operation according to the sixth embodiment of the vehicle cleaner system.

FIG. 12 is a timing chart showing an operation (operation mode E) of the cleaner system 200. For example, the operation mode E shown in FIG. 12 is suitable for the case where the vehicle is driven in the fully automatic driving mode or the advanced driving assistance mode. In the present embodiment, similarly to the operation mode A according to the first embodiment, the control unit 116 increases the number of times of operations of the LC nozzles 103 and 104 to be larger than the number of times of operations of the WW nozzles 101 and 102 and the HC nozzles 107 and 108, and operates the LC air nozzles 203 to 206 after the operation of the LC nozzles 103 to 106. For example, it is preferable that the control unit 116 operates the compressed air generating device 212 and starts to spray the compressed air by the LC air nozzles 203 to 206 after the spraying of the cleaning liquid performed by the LC nozzles 103 to 106 is completed.

In this way, in the cleaner system 200, the compressed air can be supplied to the LiDARs 6f, 6b, 6r and 6l together with the cleaning liquid. If the cleaning liquid remains on the LiDARs 6f, 6b, 6r and 6l, the information on the outside of the vehicle cannot be acquired properly, thus safety during the automatic driving may be impaired. Therefore, residual cleaning liquid on sensor surfaces can be reliably prevented by spraying the compressed air separately from the cleaning liquid to the LiDARs 6f, 6b, 6r and 6l, where the residual cleaning liquid is likely to be troublesome.

As the method for differentiating the cleaning methods, methods of differentiating types of the cleaning liquid, presence or absence of a wiper, and presence or absence of a check valve can be adopted in addition to the methods described in the above embodiments.

Seventh Embodiment

Although in the embodiment described above, a configuration in which the nozzles 101 to 108 are connected to the tank 111 is exemplified, the present embodiment is not limited thereto.

Figure 13:
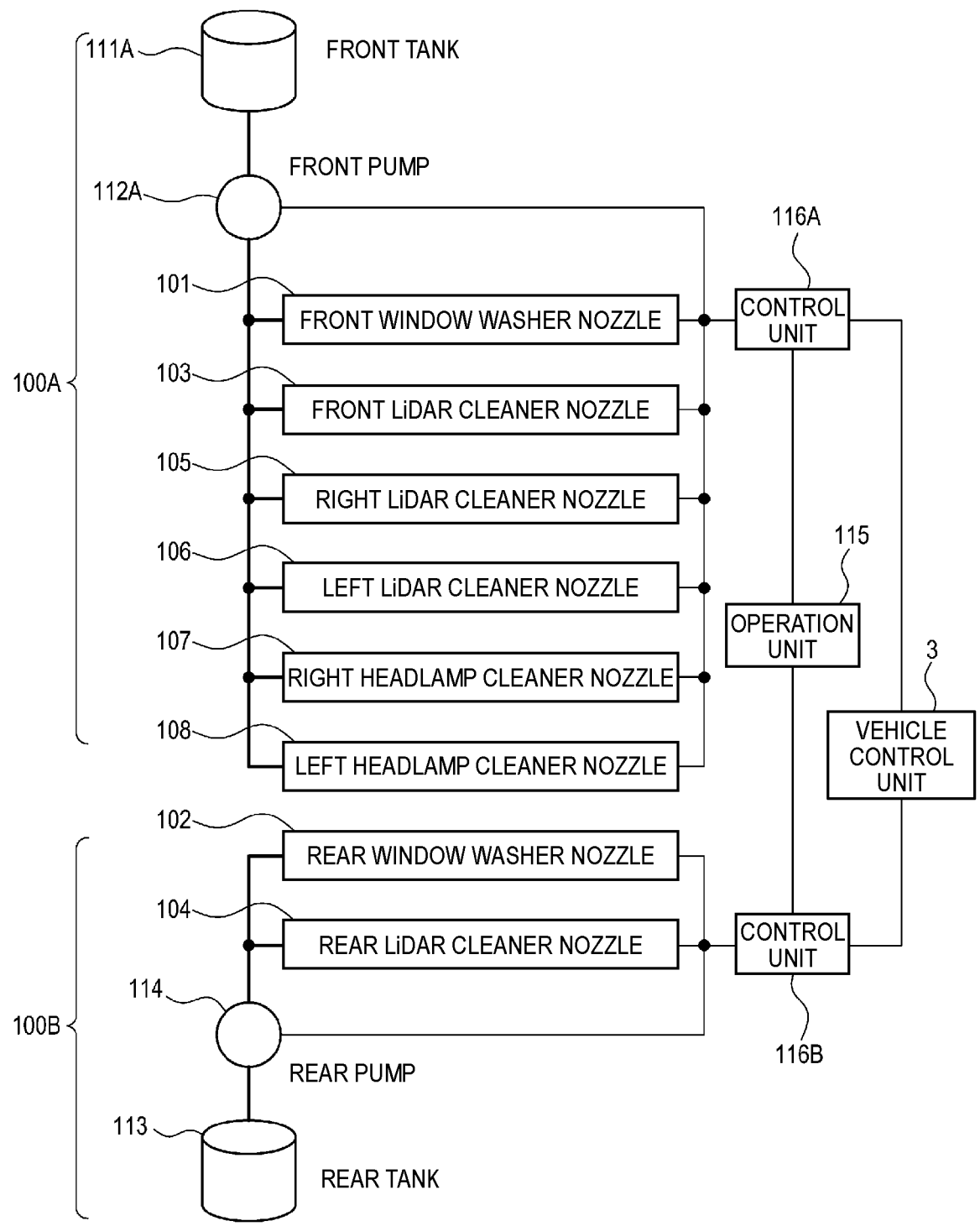
FIG. 13 is a block diagram according to a seventh embodiment of the vehicle cleaner system.

FIG. 13 is a block diagram of cleaner systems 100A and 100B according to a seventh embodiment of the present invention.

As shown in FIG. 13, the cleaner system 100A includes the front WW nozzle 101, the front LC nozzle 103, the right LC nozzle 105, the left LC nozzle 106, the right HC nozzle 107, the left HC nozzle 108, a front tank 111A, a front pump 112A (an example of the single pump), and a control unit 116A (an example of the cleaner control unit). The front WW nozzle 101, the front LC nozzle 103, the right LC nozzle 105, the left LC nozzle 106, the right HC nozzle 107, and the left HC nozzle 108 are connected to the front tank 111A via the front pump 112A. The front pump 112A sends cleaning liquid stored in the front tank 111A to the nozzles 101, 103, and 105 to 108.

The cleaner system 100B includes the rear WW nozzle 102, the rear LC nozzle 104, a rear tank 113, a rear pump 114 (an example of the single pump), and a control unit 116B (an example of the cleaner control unit). The rear WW nozzle 102 and the rear LC nozzle 104 are connected to the rear tank 113 via the rear pump 114. The rear pump 114 sends cleaning liquid stored in the rear tank 113 to the rear WW nozzle 102 and the rear LC nozzle 104.

As shown in FIG. 13, the cleaner systems may be configured separately at the front portion and the rear portion of the vehicle 1. In this case, the control unit 116A is also capable of changing the magnitude relationship between the number of times of operations of the front WW nozzle 101, the number of times of operations of the LC nozzles 103, 105 and 106, and the number of times of operations of the HC nozzles 107 and 108. The control unit 116B is capable of changing the magnitude relationship between the number of times of operations of the rear WW nozzle 102 and the number of times of operations of the rear LC nozzle 104. Accordingly, since the cleaner systems 100A and 100B, which include the single pumps 112A and 114, can be operated to suit various scenes, the system is simplified and usability thereof is improved.

The nozzles 101 to 108 may be connected to different tanks. Alternatively, the nozzles 101 to 108 may be connected to a common tank for each type of cleaning target object. For example, the LiDAR nozzles 105 to 108 may be connected to a common first tank, and the lamp nozzles 107 and 108 may be connected to a second tank different from the first tank.

Alternatively, the nozzles 101 to 108 may be connected to a common tank for each arrangement position of the cleaning target object. For example, the front WW nozzle 101 and the front LC nozzle 103 may be connected to a common front tank, the right LC nozzle 105 and the right HC nozzle 107 may be connected to a common right tank, the rear WW nozzle 102 and the rear LC nozzle 104 may be connected to a common rear tank, and the left LC nozzle 106 and the left HC nozzle 108 may be connected to a common left tank.

In these cases, the nozzles 101 to 108 are also operable by a single pump to differentiating the cleaning methods of the nozzles 101 to 108 from each other depending on the cleaning target objects, so that an easy-to-use cleaner system can be provided.

Although in the present embodiment, the driving mode of the vehicle has been described as including the fully automatic driving mode, the advanced driving assistance mode, the driving assistance mode, and the manual driving mode, the driving mode of the vehicle should not be limited to these four modes. The driving mode of the vehicle may include at least one of these four modes. For example, the driving mode of the vehicle may only include the fully automatic driving mode.

Further, a classification and a display form of the driving mode of the vehicle may be appropriately changed according to laws or regulations related to automatic driving in each country. Similarly, the definitions of the "fully automatic driving mode", the "advanced driving assistance mode", and the "driving assistance mode" described in the description of the present embodiment are merely examples, and the definitions may be appropriately changed according to laws or regulations related to automatic driving in each country.

In the embodiment described above, although an example in which the cleaner system 100 is mounted on a vehicle that can be automatically driven has been described, the cleaner system 100 may also be mounted on a vehicle that cannot be automatically driven.

In the embodiment described above, although the nozzles 103 to 106 for cleaning the LiDARs have been described as the nozzles for cleaning the external sensor, the present invention is not limited thereto. The cleaner system 100 may include a nozzle for cleaning the camera, a nozzle for cleaning the radar, and the like instead of the nozzles 103 to 106, or may include the nozzles 103 to 106 as well. In a case where a plurality of sensor cleaners (sensor cleaner nozzles) are included respectively corresponding to a plurality of external sensors having different detection methods (for example, the LiDAR and the camera) and a plurality of external sensors having different mounting positions from each other (for example, the front LiDAR and the rear LiDAR), the control unit 116 may operate these sensor cleaners such that the cleaning methods of the plurality of sensor cleaners are different from each other. The external sensors having different detection methods, such as the LiDAR and the camera, often require different scenes. Therefore, by differentiating the cleaning method for each type of the external sensors, cleanliness can be easily maintained for each sensor according to specific scenes.

An external sensor, such as the LiDAR, may include a detection surface and a cover which covers the detection surface. The nozzle for cleaning the external sensor may be configured to clean the detection surface or may be configured to clean the cover which covers the sensor.

The cleaning medium discharged by the cleaner system 100 includes air, water, or cleaning liquid containing detergent. The cleaning medium discharged to each of the front and rear windows, the headlamp, and the LiDAR may be different or may be the same.

Although an example in which the cleaning medium is discharged from the nozzles 101 to 108 by operating the actuators provided in the nozzles 101 to 108 has been described in the embodiment described above, the present invention is not limited thereto.

A configuration, in which normally closed valves are provided in each of the nozzles 101 to 108, the pump is operated such that a pressure between the tank and the nozzles 101 to 108 is always high, and the control unit 116 opens the valves provided in the nozzles 101 to 108 to discharge the cleaning medium from the nozzles 101 to 108, may be adopted.

The nozzles 101 to 108 are provided with one or more discharge holes for discharging the cleaning medium. The nozzles 101 to 108 may be provided with one or more discharge holes for discharging the cleaning liquid and one or more discharge holes for discharging the air.

Each of the nozzles 101 to 108 may be provided individually, or a plurality of nozzles may be configured as a unit. For example, the right LC nozzle 105 and the right HC nozzle 107 may be configured as a single unit. The right LC nozzle 105 and the right HC nozzle 107 may be configured as the single unit with respect to a mode in which the right headlamp 7r and the right LiDAR 6r are integrated.

Although the input of the operation signal to the control unit 116 in the above embodiment is based on the signal output from the operation unit 115, such as the switch operated by the user, it may also be configured such that a signal, which is output when dirt is detected by dirt sensors mounted in each portion of the vehicle, is input to the control unit 116, for example.

Alternatively, it may be configured such that the signal, which is output when the dirt is detected by the dirt sensors, is input to the vehicle control unit 3 (ECU or automatic driving control unit), and a signal for operating at least one of the various cleaner nozzles is input from the vehicle control unit 3 to the control unit 116.

It may also be configured such that the signal, which is output when the dirt is detected by the sensors, is input to the vehicle control unit 3, and a signal for operating at least one of the various cleaners is input from the vehicle control unit 3 to the various cleaners. In this case, the control unit 116 is implemented as a portion of the vehicle control unit 3.

Figure 14:
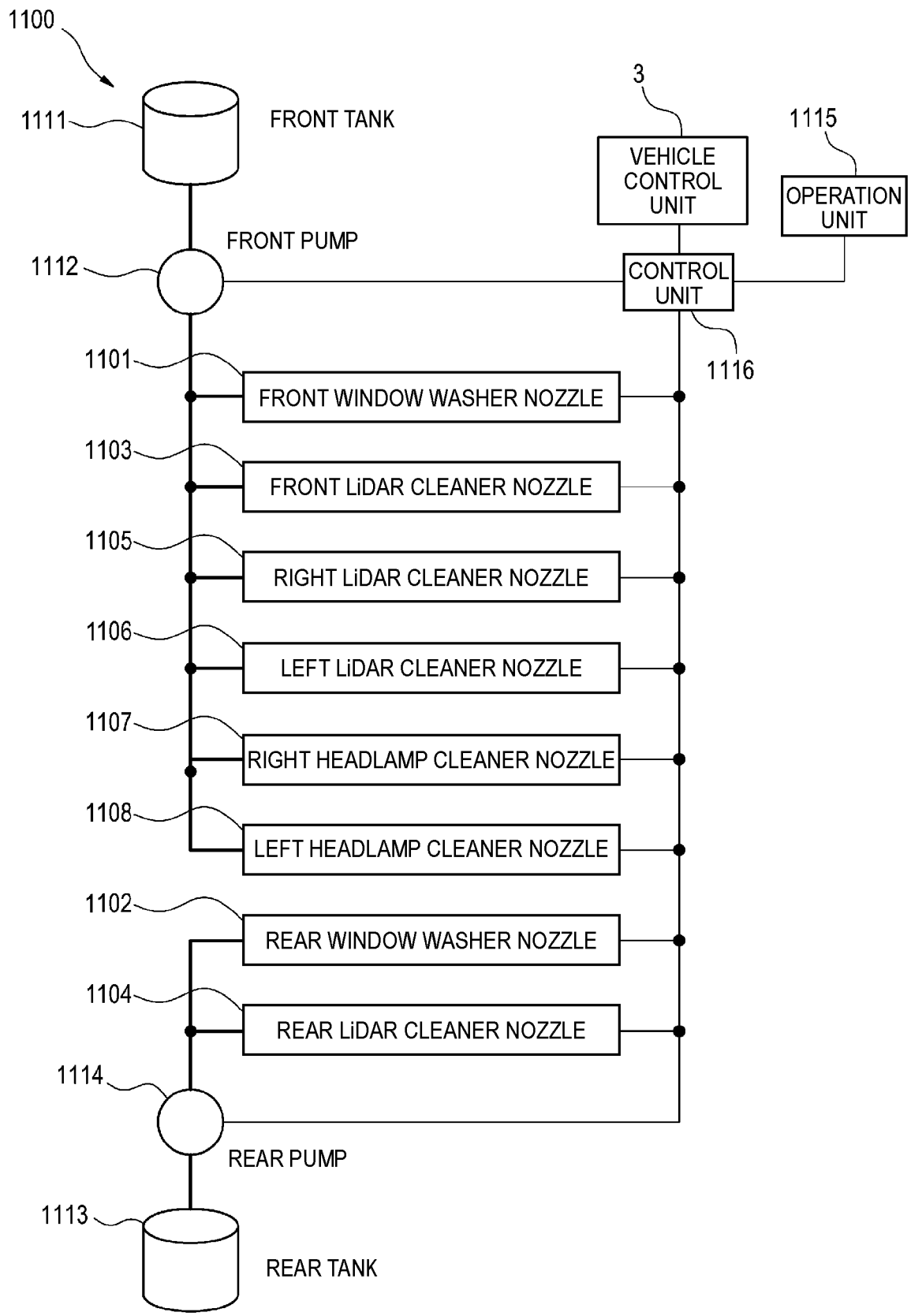
FIG. 14 is a block diagram according to eighth to eleventh embodiments of the vehicle cleaner system.

FIG. 14 is a block diagram of a cleaner system 1100 according to eighth to eleventh embodiments. In addition to nozzles 1101 to 1108, the cleaner system 1100 includes a front tank 1111, a front pump 1112, a rear tank 1113, a rear pump 1114, an operation unit 1115, and a control unit 1116 (an example of the cleaner control unit). In the present embodiment, the nozzles 1101 to 1108 are capable of discharging cleaning liquid toward the cleaning target objects.

The front WW nozzle 1101, the front LC nozzle 1103, the right LC nozzle 1105, the left LC nozzle 1106, the right HC nozzle 1107, and the left HC nozzle 1108 are connected to the front tank 1111 via the front pump 1112. The front pump 1112 sends cleaning liquid stored in the front tank 1111 to the front WW nozzle 1101, the front LC nozzle 1103, the right LC nozzle 1105, the left LC nozzle 1106, the right HC nozzle 1107, and the left HC nozzle 1108.

The rear WW nozzle 1102 and the rear LC nozzle 1104 are connected to the rear tank 1113 via the rear pump 1114. The rear pump 1114 sends cleaning liquid stored in the rear tank 1113 to the rear WW nozzle 1102 and the rear LC nozzle 1104.

The operation unit 1115 is a device which can be operated by the user of the vehicle 1. The operation unit 1115 outputs a signal in accordance with the operation of the user, and the signal is input to the control unit 1116. For example, the operation unit 1115 can be configured by a switch or the like provided in the vehicle compartment.

Each of the nozzles 1101 to 1108 is provided with an actuator which opens the nozzle and discharges the cleaning liquid to the cleaning target object. The actuators provided in the nozzles 1101 to 1108 are electrically connected to the control unit 1116. The control unit 1116 is also electrically connected to the front pump 1112, the rear pump 1114, the operation unit 1115, and the vehicle control unit 3.

For example, when a signal for cleaning the front window 1f is input to the control unit 1116, the control unit 1116 operates the front pump 1112 to send the cleaning liquid from the front tank 1111 to the front WW nozzle 1101, and operates the actuator of the front WW nozzle 1101 to discharge the cleaning liquid from the front WW nozzle 1101.

Eighth Embodiment

Figure 15:
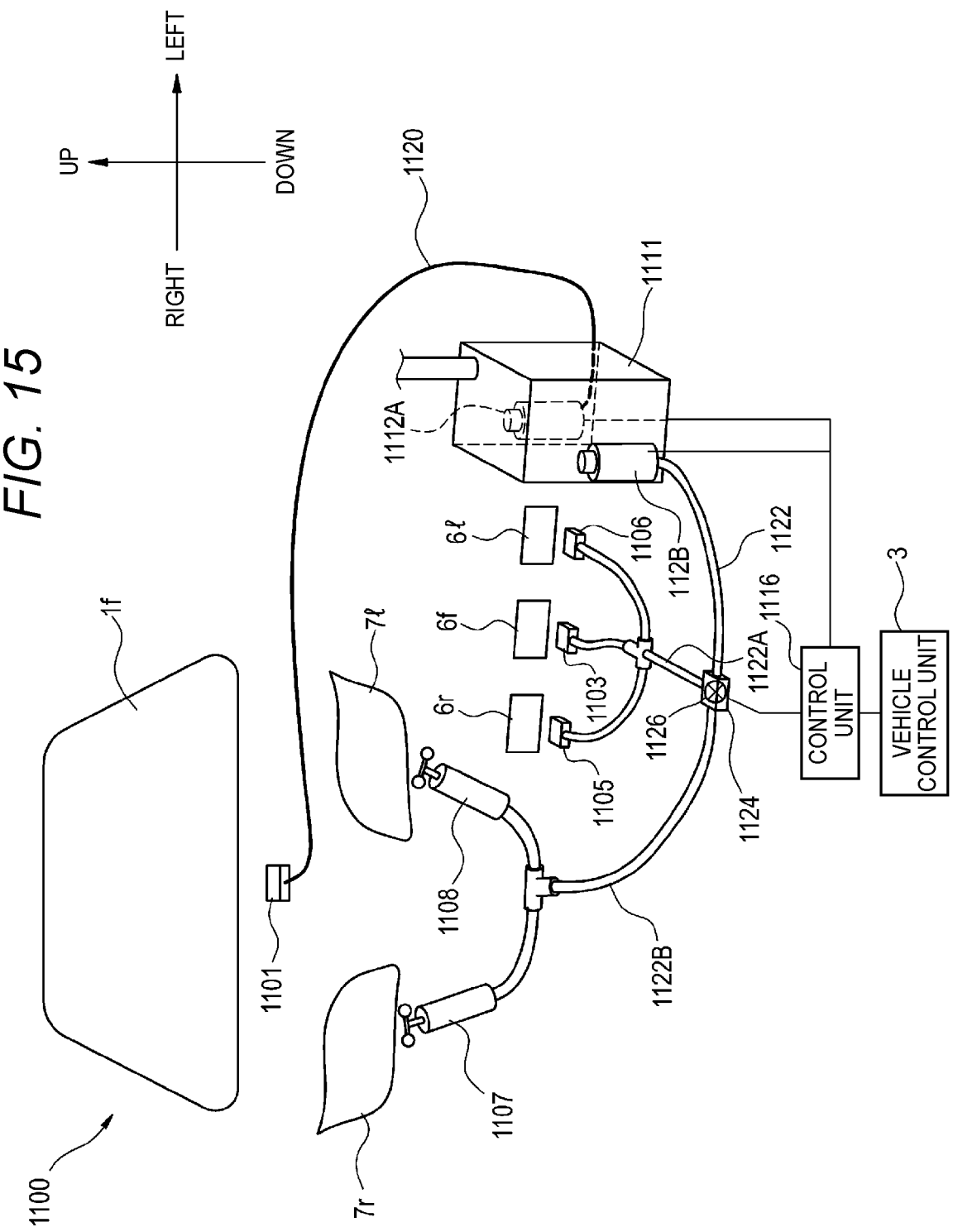
FIG. 15 is a schematic view of the vehicle cleaner system according to the eighth embodiment.

FIG. 15 is a schematic view of the cleaner system 1100 according to the eighth embodiment.

As shown in FIG. 15, a plurality of pumps (a WW front pump 1112A and an LC/HC front pump 1112B) are attached to the front tank 1111 as examples of the front pump 1112. The WW front pump 1112A (an example of the first pump) is a pump for supplying the cleaning liquid to the front WW nozzle 1101, and is provided, for example, on a rear side of the front tank 1111. The LC/HC front pump 1112B (an example of a second pump) is a pump for supplying the cleaning liquid to the front LC nozzle 1103, the right LC nozzle 1105, the left LC nozzle 1106, the right HC nozzle 1107, and the left HC nozzle 1108, and is provided, for example, on a front side of the front tank 1111.

A pipe line 1120 (an example of the first pipe line) is connected between the WW front pump 1112A and the front WW nozzle 1101. A pipe line 1122 (an example of the second pipe line) is connected each between the LC/HC front pump 1112B and the front LC nozzle 1103, the right LC nozzle 1105 and the left LC nozzle 1106, and between the LC/HC front pump 1112B and the right HC nozzle 1107 and the left HC nozzle 1108. A branch portion 1124 is provided in the middle of the pipe line 1122, which branches the second pipe line 1122 into a side of the LC nozzles 1103, 1105 and 1106 and a side of the HC nozzles 1107 and 1108. A switching valve 1126 is provided inside the branch portion 1124. The switching valve 1126 is connected to the control unit 1116, and can be appropriately switched, upon receiving a signal from the control unit 1116, between a case where the cleaning liquid flowing through the pipe line 1122 is flowed into the pipe line 1122A on the side of the LC nozzles 1103, 1105 and 1106, and a case where the cleaning liquid is flowed into the pipe line 1122B on the side of the HC nozzles 1107 and 1108. In this case, when the cleaning liquid is being sprayed from the LC nozzles 1103, 1105 and 1106, the cleaning liquid is not sprayed from the HC nozzles 1107 and 1108 (vice versa). A configuration, in which the switching valve 1126 is not provided, and the cleaning liquid always flows into both the pipe line 1122A on the side of the LC nozzles 1103, 1105 and 1106 and the pipe line 1122B on the side of the HC nozzles 1107 and 1108 when the LC/HC front pump 1112B is operated, may also be adopted.

Here, it is preferable that the pipe line 1122 (including the 1122A and the 1122B) for supplying the cleaning liquid from the front tank 1111 to the LC nozzles 1103, 1105 and 1106, and the HC nozzles 1107 and 1108 is thicker than the pipe line 1120 for supplying the cleaning liquid from the front tank 1111 to the front WW nozzle 1101. It is preferable that the pipe line 1122 on the LC nozzle side is shorter than the pipe line 1120 on the WW nozzle side. That is, it is preferable that a length of the pipe line 1122 is set to be shorter than a length of the pipe line 1120 (specifically, a length from the LC/HC front pump 1112B to the LC nozzles 1103, 1105 and 1106).

The WW front pump 1112A and the LC/HC front pump 1112B are connected to the control unit 1116. For example, the control unit 1116 controls the WW front pump 1112A and the LC/HC front pump 1112B such that a spray pressure of the cleaning liquid sprayed from the LC nozzles 1103, 1105 and 1106 is higher than a spray pressure of the cleaning liquid sprayed from the front WW nozzle 1101. In addition to the control of the spray pressure, or in place of the control of the spray pressure, the control unit 1116 can control the WW front pump 1112A and the LC/HC front pump 1112B such that a spray time, the number of times of spray, or the like of the cleaning liquid are differentiated between the front WW nozzle 1101 and the LC nozzles 1103, 1105 and 1106. In this case, it is preferable that the control unit 1116 sets the spray time of the cleaning liquid sprayed from the LC nozzles 1103, 1105 and 1106 to be longer than the spray time of the cleaning liquid sprayed from the front WW nozzle 1101, or sets the number of times of spray of the cleaning liquid sprayed from the LC nozzles 1103, 1105 and 1106 to be larger than the number of times of spray of the cleaning liquid sprayed from the front WW nozzle 1101.

A pump control unit for controlling the WW front pump 1112A and the LC/HC front pump 1112B may be provided separately from the control unit 1116, and the pump control unit may control the spray pressure, the spray time, the number of times of spray, and the like of the cleaning liquid by the WW front pump 1112A and the LC/HC front pump 1112B upon receiving a signal from the vehicle control unit 3 or the control unit 1116.

Although not shown, the rear pump 1114 includes a plurality of pumps (a WW rear pump and an LC rear pump), and the WW rear pump and the LC rear pump are attached at different positions to the rear tank 1113. A pipe line connecting the WW rear pump and the rear WW nozzle 1102 is provided separately from a pipe line connecting the LC rear pump and the rear LC nozzle 1104, and the pipe line on the side of the rear LC nozzle 1104 is preferably thicker and/or shorter than the pipe line on the side of the rear WW nozzle 1102. The WW rear pump and the LC rear pump are connected to the control unit 1116, and it is preferable that the control unit 1116 controls the WW rear pump and the LC rear pump such that the spray pressure of the cleaning liquid from the rear LC nozzle 1104 is higher than the spray pressure of the cleaning liquid from the rear WW nozzle 1102.

When the vehicle is driven in the automatic driving mode (in particular, the fully driving mode and the advanced driving assistance mode), it is required to maintain the sensitivity of the LiDARs 6*f*, 6*b*, and 6*l*. Therefore, in this case, the cleanliness required for the LiDARs 6*f*, 6*b*, 6*r* and 6*l* is higher than that required for the front window 1*f*, the rear window 1*b*, and the headlamps 7*r* and 7*l*.

Therefore, in the cleaner system 1100 according to the eighth embodiment, the pipe line 1120 which is connected between the front WW nozzle 1101 and the WW front pump 1112A and supplies the cleaning liquid from the front tank 1111 to the front WW nozzle 1101 is differentiated from (provided separately from) the pipe line 1122 which is connected between the LC nozzles 1103, 1105 and 1106 and the LC/HC front pump 1112B and supplies the cleaning liquid from the front tank 1111 to the LC nozzles 1103, 1105 and 1106. The pipe line which is connected between the rear WW nozzle 1102 and the WW rear pump and supplies the cleaning liquid from the rear tank 1113 to the rear WW nozzle 1102 is differentiated from the pipe line which is connected between the rear LC nozzle 1104 and the LC rear pump and supplies the cleaning liquid from the rear tank 1113 to the rear LC nozzle 1104. Accordingly, for example, since the spray pressure, the spray time, the number of times of spray, and the like of the cleaning liquid can be differentiated between the WW nozzles 1101 and 1102 and the LC nozzles 1103 to 1106, cleaning can be performed with an appropriate cleaning method for each cleaning target object. In the present cleaner system 1100, since it is not necessary to provide a tank for each cleaning target object, the system can be simplified and the cost can be reduced.

In a case where the pipe lines are, for example, circular pipes, pressure loss is expressed by the following equation (1), in which L refers to the length of the pipe line, d refers to a pipe diameter, ρ refers to density, and v refers to flow velocity. Here, λ is a pipe friction coefficient.

(Equation 1)

$$\Delta P = \lambda \cdot \frac{L}{d} \cdot \frac{\rho \cdot v^2}{2} \qquad \text{Equation (1)}$$

According to the above equation (1), when the length L of the pipe line is long, the pressure loss ΔP increases. Meanwhile, when the length L of the pipe line is short, the pressure loss ΔP decreases. When the pipe diameter d is large, the pressure loss ΔP decreases, and when the pipe diameter d is small, the pressure loss ΔP increases. Therefore, in the present cleaner system 1100, the pipe line for supplying the cleaning liquid to the LC nozzles 1103 to 1106 (for example, the pipe line 1122) is thicker and/or shorter than the pipe line for supplying the cleaning liquid to the WW nozzles 1101 and 1102 (for example, the pipe line 1120). Accordingly, the cleaning liquid can be sprayed at a higher pressure from the LC nozzles 1103 to 1106 than that sprayed from the WW nozzles 1101 and 1102.

As described above, by controlling the front pump 1112 (the WW front pump 1112A and the LC/HC front pump 1112B) and the rear pump 1114 (the WW rear pump and the LC rear pump) through the control unit 1116, the cleaning liquid can be sprayed from the LC nozzles 1103 to 1106 to the LiDARs 6*f*, 6*b*, 6*r* and 6*l* at a higher pressure.

Although a configuration, in which the nozzles 1101, 1103, and 1105 to 1108 are connected to the front tank 1111 and the nozzles 1102 and 1104 are connected to the rear tank 1113, has been described in the eighth to eleventh embodiments described above, the present invention is not limited thereto. For example, the nozzles 1101 to 1108 may be connected to a single tank. In this case, the pipe line connected between the LC nozzles 1103 to 1106 and the tank is also provided separately from the pipe line connected between the WW nozzles 1101 and 1102 and the tank, and the pipe line on the side of the LC nozzle is also thicker and/or shorter than the pipe line on the side of the WW nozzle.

Alternatively, the nozzles 1101 to 1108 may be connected to a common tank for each arrangement position of the cleaning target object. For example, the front WW nozzle 1101 and the front LC nozzle 1103 may be connected to a common front tank, the right LC nozzle 1105 and the right HC nozzle 1107 may be connected to a common right tank, the rear WW nozzle 1102 and the rear LC nozzle 1104 may be connected to a common rear tank, and the left LC nozzle 1106 and the left HC nozzle 1108 may be connected to a common left tank. In this case, for example, the pipe line connected between the common front tank and the front WW nozzle 1101 and the pipe line connected between the common front tank and the front LC nozzle 1103 are also different, and the pipe line on the side of the front LC nozzle 1103 is also thicker and/or shorter than the pipe line on the side of the front WW nozzle 1101. Further, the pipe line connected between the common rear tank and the rear WW nozzle 1102 and the pipe line connected between the common rear tank and the rear LC nozzle 1104 are different, and the pipe line on the side of the rear LC nozzle 1104 is also thicker and/or shorter than the pipe line on the side of the rear WW nozzle 1102.

Alternatively, a configuration, in which each of the nozzles 1101 to 1108 is connected to a separate pump, and the control unit 1116 controls each of the pumps individually so as to control the discharge of the cleaning medium from the nozzles 1101 to 1108, may be adopted. In this case, each of the nozzles 1101 to 1108 may be connected to different tanks, or may be connected to a common tank. In this case, it is also preferable that the pipe line connected between the pump and the WW nozzle and the pipe line connected between the pump and the LC nozzle are different, and the pipe line on the side of the LC nozzle is thicker and/or shorter than the pipe line on the side of the WW nozzle.

Although the nozzles 1103 to 1106 which clean the LiDARs have been described as nozzles for cleaning the external sensor in the embodiment described above, the present invention is not limited thereto. The cleaner system 1100 may include a nozzle for cleaning the camera, a nozzle for cleaning the radar, and the like instead of the nozzles 1103 to 1106, or may include the nozzles 1103 to 1106 as well. In a case where a plurality of sensor cleaners (sensor cleaner nozzles) are included respectively corresponding to a plurality of external sensors having different detection methods (for example, the LiDAR and the camera) and a plurality of external sensors having different mounting positions from each other (for example, the front LiDAR and the rear LiDAR), the control unit 1116 may be configured such that the pipe lines between the plurality of sensor cleaners and the pump are different from each other. The external sensors having different detection methods, such as the LiDAR and the camera, often require different scenes. Therefore, by differentiating the pipe lines for each type of the external sensors, the spray pressure, the spray time, the number of times of spray, and the like of the cleaning liquid can be differentiated, and cleanliness can be easily maintained for each sensor according to specific scenes.

Ninth Embodiment

Figure 16:
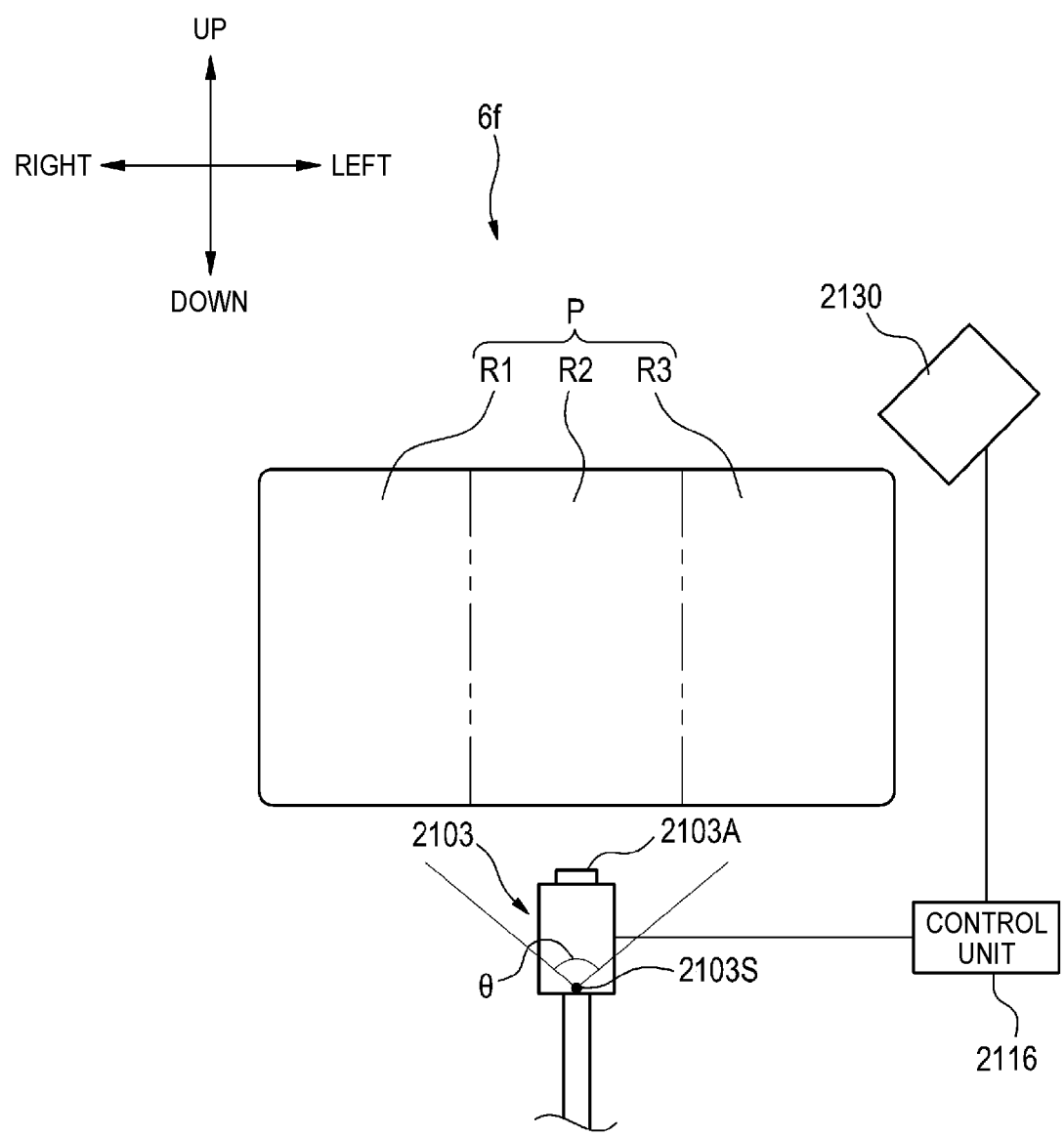
FIG. 16 is a schematic view showing a sensor and a sensor cleaner which sprays cleaning liquid to the sensor according to the ninth embodiment.

FIG. 16 is a schematic view showing an LiDAR and an embodiment of an LC nozzle which sprays cleaning liquid to the LiDAR (the ninth embodiment). In FIG. 16, the front LiDAR 6f among the plurality of LiDARs 6f, 6b, 6r and 6l is exemplified as an example, and is shown together with a front LC nozzle 2103.

The front LiDAR 6f includes, for example, a horizontally long rectangular shaped cleaning target surface P, as shown in FIG. 16. The front LC nozzle 2103 is attached so as to be movable with respect to the cleaning target surface P of the front LiDAR 6f. That is, the front LC nozzle 2103 is rotatable by a movable device (not shown) within a rotation angle θ about a rotation axis 2103S. A configuration in which a body portion of the front LC nozzle 2103 is fixed and only a portion of an opening portion 2103A is rotatable may be adopted.

A dirt sensor 2130 (an example of the dirt detection unit) configured to detect presence or absence of dirt on the cleaning target surface P of the front LiDAR 6f is provided in the vicinity of the front LiDAR 6f. The dirt sensor 2130 is connected to a control unit 2116, and transmits a dirt signal to the control unit 2116 when the dirt is detected on the cleaning target surface P of the front LiDAR 6f. The dirt sensor 2130 divides the cleaning target surface P of the front LiDAR 6f into a plurality of regions, and can detect which region the dirt is attached to. Specifically, the cleaning target surface P is divided in the left-right direction into three regions including a right region R1, a central region R2, and a left region R3.

Figure 17A:
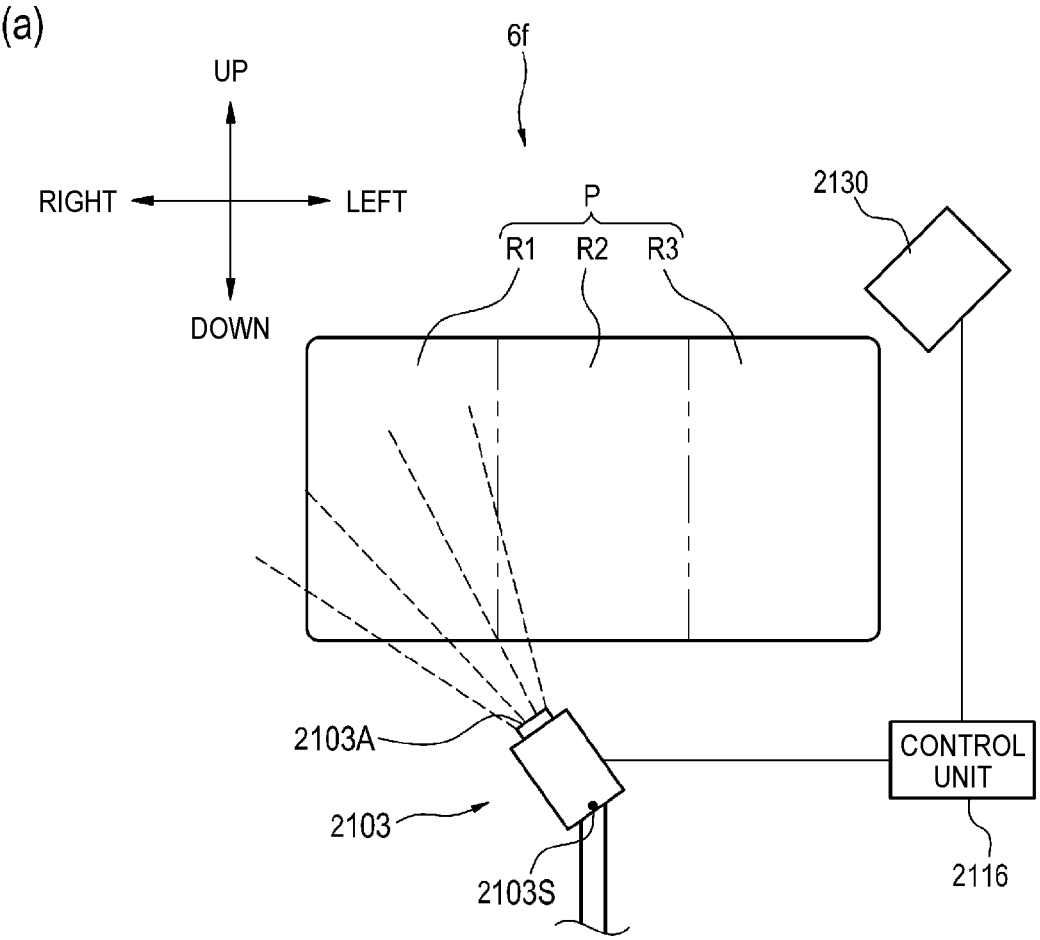
FIG. 17A shows an operation example of the sensor cleaner according to the ninth embodiment.
Figure 17B:
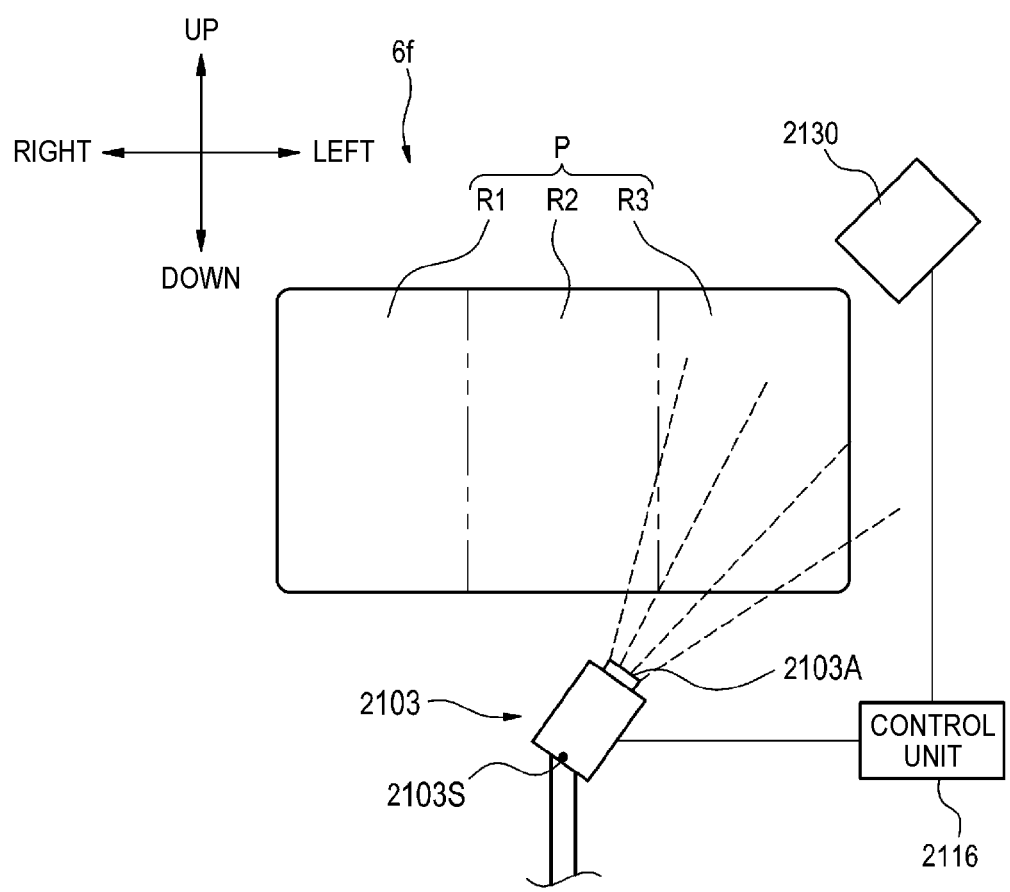
FIG. 17B shows an operation example of the sensor cleaner according to the ninth embodiment.

The control unit 2116 moves the front LC nozzle 2103 based on the dirt signal received from the dirt sensor 2130, so that the opening portion 2103A of the front LC nozzle 2103 faces the region where the dirt is determined to be adhered among the plurality of regions R1 to R3 of the cleaning target surface P. For example, when it is determined that the dirt is attached to the right region R1 among the plurality of regions R1 to R3, as shown in FIG. 17A, the control unit 2116 controls the opening portion 2103A of the front LC nozzle 2103 to face the right region R1, the front LC nozzle 2103 is rotated about the rotation axis 2103S, and the cleaning liquid is sprayed from the front LC nozzle 2103 toward the right region R1. When it is determined that the dirt is attached to the right region R1 and the left region R3, the control portion 2116 rotates the front LC nozzle 2103 such that the opening portion 2103A of the front LC nozzle 2103 faces the right region R1 at first and the cleaning liquid is sprayed from the front LC nozzle 2103 toward the right region R1, as shown in FIG. 17B, then the front LC nozzle 2103 is rotated such that the opening portion 2103A of the front LC nozzle 2103 faces the left region R3, and the cleaning liquid is sprayed from the front LC nozzle 2103 toward the left region R3. In this way, the control unit 2116 can spray the cleaning liquid only to the region where the dirt is attached, that is, only to the region to be cleaned among the plurality of regions R1 to R3 of the cleaning target surface P of the front LiDAR 6f. That is, the control unit 2116 operates the movable front LC nozzle 2103, such that cleaning strength for the region to be cleaned is differentiated from the cleaning strength for a region not to be cleaned among the plurality of regions R1 to R3. Accordingly, since the cleaning liquid can be efficiently sprayed to the region to be cleaned on the cleaning target surface P, the cleaning liquid can be saved, and the cleanliness of the front LiDAR 6f, which is the cleaning target object, can be maintained.

The dirt sensor 2130 may also detect a degree of the dirt attached to the cleaning target surface P (dirt degree), and transmit a dirt signal including dirt degree information to the control unit 2116. In this case, as an example of a method for differentiating the cleaning strength for the region to be cleaned and the cleaning strength for the region not to be cleaned among the plurality of regions R1 to R3, the controller 2116 can differentiate the spray pressure, the spray time, and the number of times of spray of the cleaning liquid sprayed from the front LC nozzle 2103 based on the dirt degree information received from the dirt sensor 2130 according to the dirt degree of each region of the cleaning target surface P. For example, when the dirt sensor 2130 determines that the dirt degree of the right region R1 is higher than that of the left region R3, the control unit 2116 can increase the spray pressure of the cleaning liquid sprayed from the front LC nozzle 2103 to the right region R1 to be higher than the spray pressure of the cleaning liquid sprayed to the left region R3. Similarly, the control unit 2116 can also increase the spray time of the cleaning liquid sprayed to the right region R1, or increase the number of times of spray of the cleaning liquid.

When it is determined that the dirt is attached to all of the plurality of regions R1 to R3, as shown in FIG. 16, the control unit 2116 moves the front LC nozzle 2103 such that the opening 2103A of the front LC nozzle 2103 faces the right region R1, the central region R2, and the left region R3 sequentially, and the cleaning liquid may be sequentially sprayed to the plurality of regions R1 to R3, so that the cleaning liquid is sprayed to the entire cleaning target surface P.

Tenth Embodiment

Figure 18:
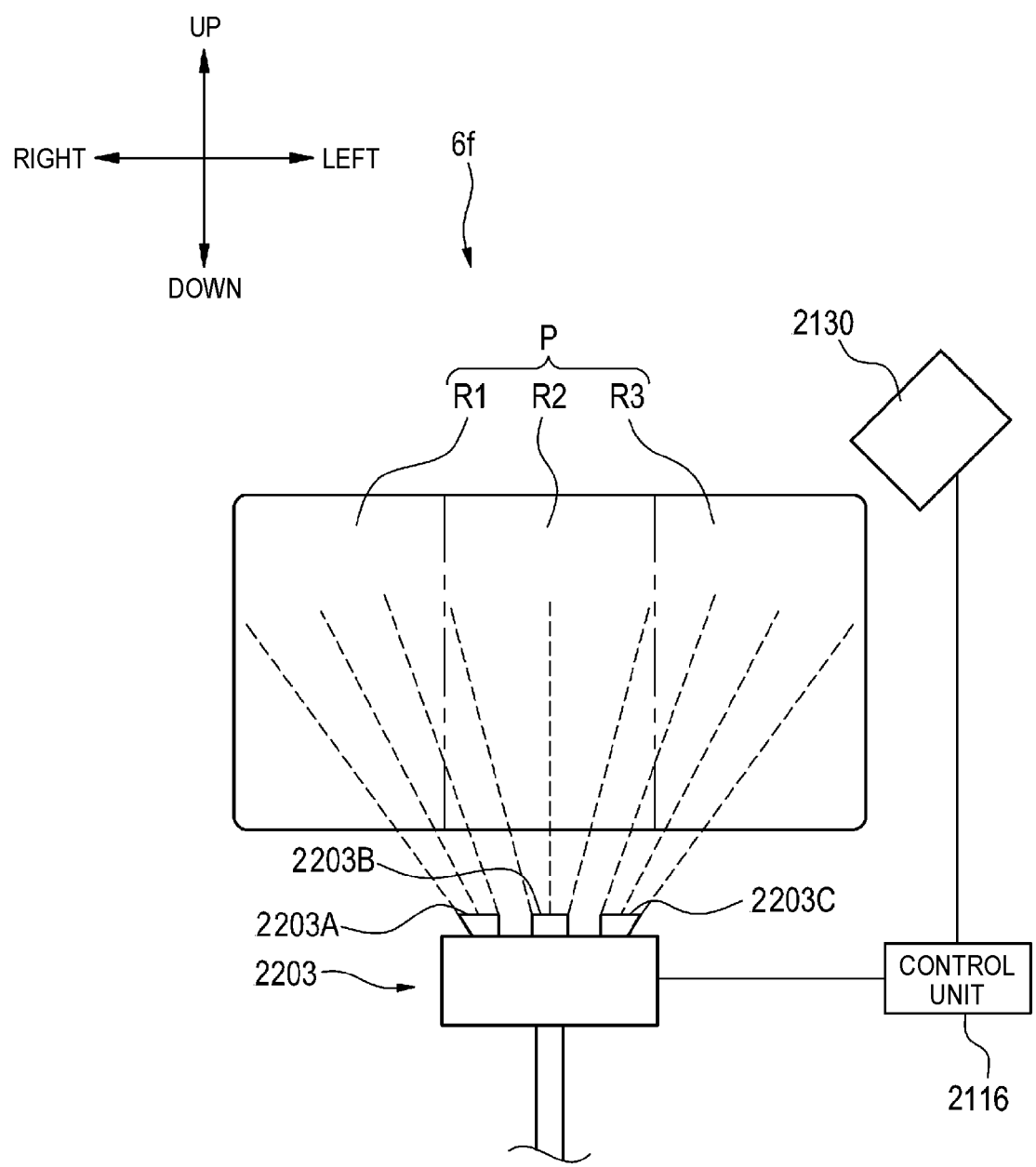
FIG. 18 is a schematic view showing a sensor and a sensor cleaner which sprays cleaning liquid to the sensor according to the tenth embodiment.
Figure 19:
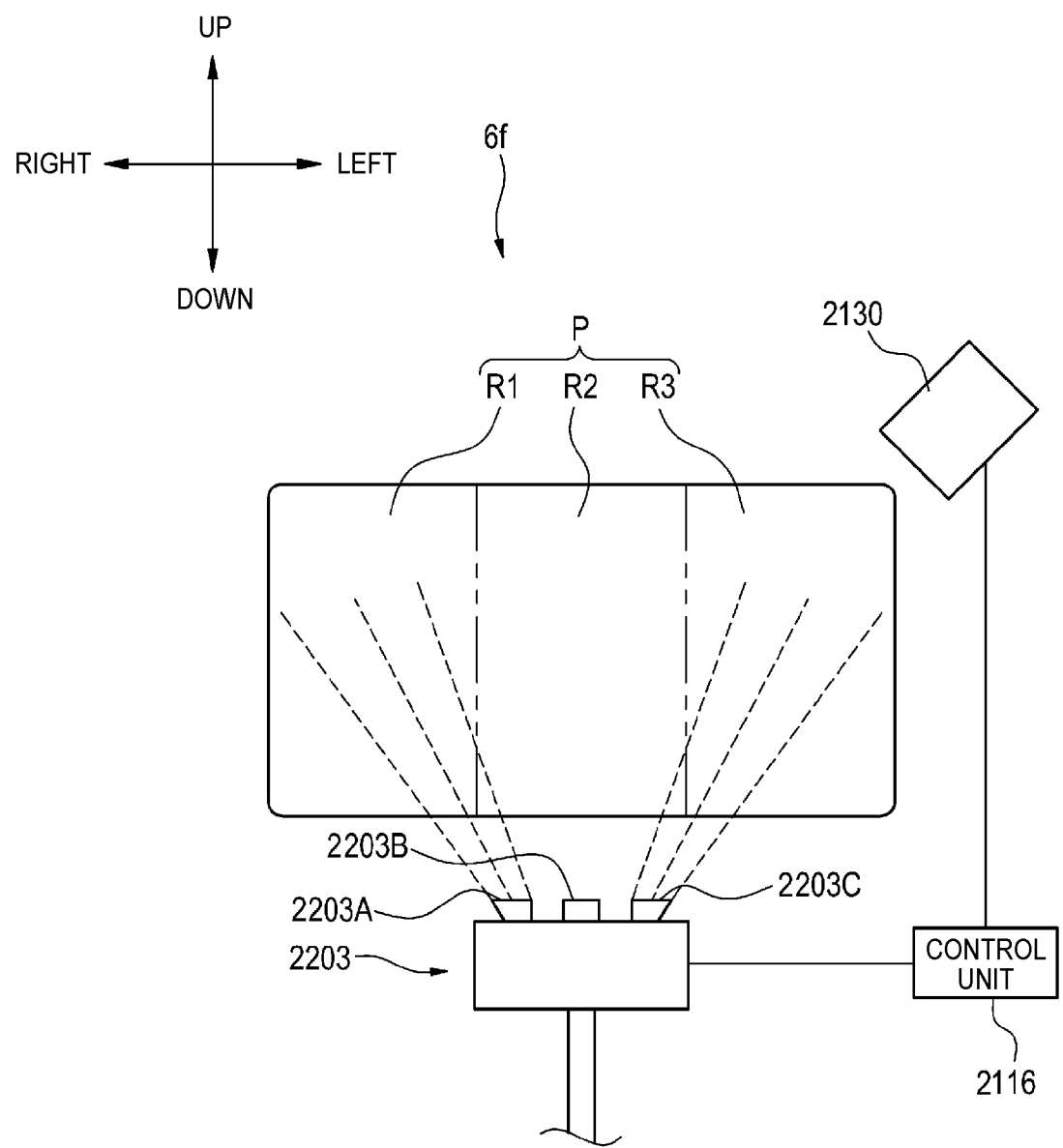
FIG. 19 shows an operation example of the sensor cleaner according to the tenth embodiment.

FIG. 18 is a schematic view showing the front LiDAR 6f and a front LC nozzle 2203 according to the tenth embodiment.

As shown in FIG. 18, the front LC nozzle 2203 according to the tenth embodiment includes a plurality of (three in this case) opening portions 2203A to 2203C. The opening portions 2203A to 2203C are arranged to face the plurality of regions R1 to R3 of the cleaning target surface P of the front LiDAR 6f, respectively. Specifically, the opening 2203A is provided in a direction facing the right region R1 of the cleaning target surface P, the opening 2203B is provided in a direction facing the central region R2 of the cleaning target surface P, and the opening 2203C is provided in a direction facing the left region R3 of the cleaning target surface P.

The control unit 2116 can operate the front LC nozzle 2203 based on the dirt signal from the dirt sensor 2130, so that the cleaning liquid is sprayed from the opening portion of the front LC nozzle 2203 corresponding to the region where the dirt is determined to be attached among the plurality of regions R1 to R3 of the cleaning target surface P. For example, when it is determined that the dirt is attached to the right region R1 among the plurality of regions R1 to R3, the control portion 2116 sprays the cleaning liquid toward the right region R1 from the opening portion 2203A of the front LC nozzle 2203, which corresponds to the right region R1. When it is determined that the dirt is attached to the right region R1 and the left region R3, the control portion 2116 sprays the cleaning liquid toward the right region R1 and the left region R3, respectively, from the opening portion 2203A which corresponds to the right region R1 and the opening portion 2203C which corresponds to the left region R3. In this way, in the tenth embodiment, the control unit 2116 can also spray the cleaning liquid only to the region to be cleaned among the cleaning target surfaces P of the front LiDAR 6f. Accordingly, since the cleaning liquid can be efficiently sprayed to the region to be cleaned on the cleaning target surface P, the cleaning liquid can be saved, and the cleanliness of the cleaning target surface P can be maintained.

As another example of the method for differentiating the cleaning strength for the region to be cleaned and the cleaning strength for the region not to be cleaned among the plurality of regions R1 to R3, the controller 2116 can differentiate the spray pressure, the spray time, and the number of times of spray of the cleaning liquid sprayed from the opening portions 2203A to 2203C based on the dirt degree information received from the dirt sensor 2130 according to the dirt degree of each region of the cleaning target surface P. For example, when the dirt sensor 2130 determines that the dirt degree of the right region R1 is higher than that of the left region R3, the control portion 2116 can increase the spray pressure of the cleaning liquid sprayed from the opening portion 2203A to the right region R1 to be higher than the spray pressure of the cleaning liquid sprayed from the opening portion 2203C to the left region R3, or increase the spray time of the cleaning liquid, or increase the number of times of spray of the cleaning liquid.

When it is determined that the dirt adheres to the entire cleaning target surface P, as shown in FIG. 18, the control unit 2116 may spray the cleaning liquid toward the corresponding regions R1 to R3 from the respective openings 2203A to 2203C of the front LC nozzle 2203.

Eleventh Embodiment

Figure 20:
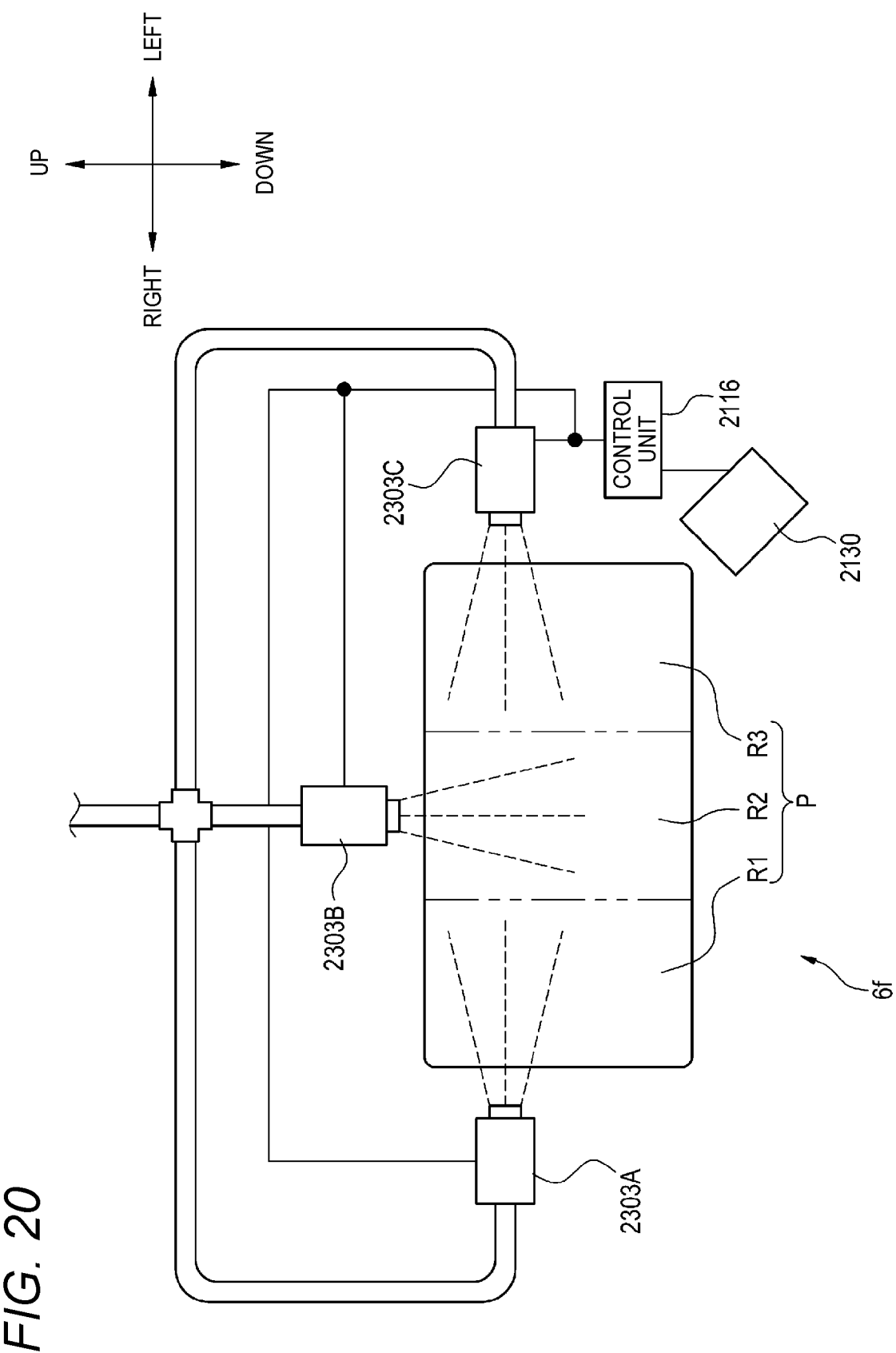
FIG. 20 is a schematic view showing a sensor and a sensor cleaner which sprays cleaning liquid to the sensor according to the eleventh embodiment.
Figure 21:
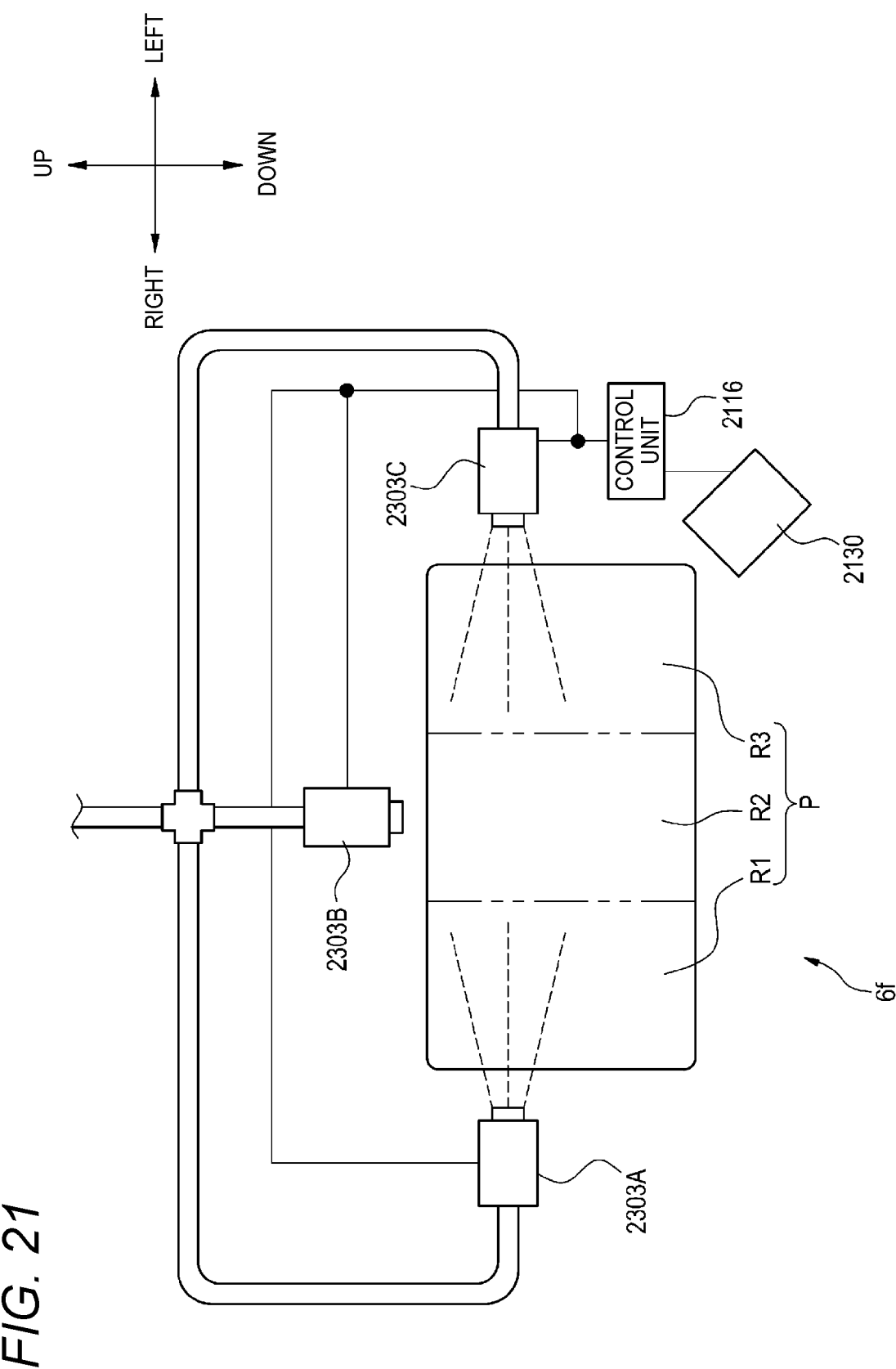
FIG. 21 shows an operation example of the sensor cleaner according to the eleventh embodiment.

FIG. 20 is a schematic view showing the front LiDAR 6f and a plurality of front LC nozzles according to the eleventh embodiment.

As shown in FIG. 20, a plurality of front LC nozzles 2303A to 2303C according to the eleventh embodiment are arranged corresponding to the plurality of regions R1 to R3 of the cleaning target surface P of the front LiDAR 6f. Specifically, the front LC nozzle 2303A is arranged at a position corresponding to the right region R1 of the cleaning target surface P, for example, at a position facing a left side surface of the cleaning target surface P. The front LC nozzle 2303B is arranged at a position corresponding to the central region R2 of the cleaning target surface P, for example, at a position facing an upper surface of the cleaning target surface P. The front LC nozzle 2303C is arranged at a position corresponding to the left region R3 of the cleaning target surface P, for example, at a position facing a right side surface of the cleaning target surface P.

The control unit 2116 can operate the front LC nozzles 2303A to 2303C based on the dirt signal from the dirt sensor 2130, so that the cleaning liquid is sprayed from the front LC nozzles 2303A to 2303C corresponding to the region where the dirt is determined to be attached among the plurality of regions R1 to R3 of the cleaning target surface P. For example, when it is determined that the dirt is attached to the right region R1 among the plurality of regions R1 to R3, the control portion 2116 sprays the cleaning liquid toward the right region R1 from the front LC nozzle 2303A, which corresponds to the right region R1. When it is determined that the dirt is attached to the right region R1 and the left region R3, the control portion 2116 sprays the cleaning liquid toward the right region R1 and the left region R3, respectively, from the front LC nozzle 2303A which corresponds to the right region R1 and the front LC nozzle 2303C which corresponds to the left region R3. In this way, in the eleventh embodiment, the control unit 2116 can also spray the cleaning liquid only to the region to be cleaned among the cleaning target surfaces P of the front LiDAR 6f. That is, the control unit 2116 sprays the cleaning liquid from the plurality of front LC nozzles 2303A to 2303C, such that the cleaning strength for the region to be cleaned is differentiated from the cleaning strength for the region not to be cleaned among the plurality of regions R1 to R3 of the front LiDAR 6f. Accordingly, since the cleaning liquid can be efficiently sprayed to the region to be cleaned on the cleaning target surface P, the cleaning liquid can be saved, and the cleanliness of the cleaning target surface P can be maintained.

Similarly to the ninth embodiment and the tenth embodiment, the controller 2116 can differentiate the spray pressure, the spray time, and the number of times of spray of the cleaning liquid sprayed from the front LC nozzles 2303A to 2303C based on the dirt degree information received from the dirt sensor 2130 according to the dirt degree of each region R1 to R3 of the cleaning target surface P. When it is determined that the dirt adheres to the entire cleaning target surface P, as shown in FIG. 20, the control unit 2116 may spray the cleaning liquid toward the regions R1 to R3 from the front LC nozzles 2303A to 2303C.

As another method for differentiating the cleaning strength for the region to be cleaned and the cleaning strength for the region not to be cleaned among the plurality of regions R1 to R3, a method of differentiating spray amount and spray area of the cleaning liquid for each of the regions R1 to R3 of the cleaning target surface P can be adopted in addition to the methods described in the above embodiments.

Although the cleaning target surface P is divided in the left-right direction into the three regions including the right region R1, the central region R2, and the left region R3 in the above embodiments, the present invention is not limited thereto. The cleaning target surface P may be divided into two or four or more, and each of the regions R1 to R3 divided in the left-right direction may also be divided into two in the up-down direction, for example, as long as the nozzle configurations according to the above embodiments can be used to control the method of spraying the cleaning liquid in each of these divided regions such that the cleaning strength for the region to be cleaned is different from the cleaning strength for the region not to be cleaned.

In a case where a plurality of sensor cleaners (sensor cleaner nozzles) are included respectively corresponding to a plurality of external sensors having different detection methods (for example, the LiDAR and the camera) and a plurality of external sensors having different mounting positions from each other (for example, the front LiDAR and the rear LiDAR), the control unit 2116 may operate these sensor cleaners such that the cleaning strength of the plurality of sensor cleaners are different from each other. The external sensors having different detection methods, such as the LiDAR and the camera, often require different scenes. Therefore, by differentiating the cleaning strength for each type of the external sensors, cleanliness can be easily maintained for each sensor according to specific scenes.

Although the dirt on the cleaning target surface P of the LiDAR 6f is detected by the dirt sensor 2130 arranged in the vicinity of the cleaning target object (for example, the LiDAR 6f) in the above embodiment, the present invention is not limited thereto. The LiDAR 6f can also detect the dirt of the cleaning target surface P by itself. In this case, the LiDAR 6f itself can be used as the dirt detection unit without separately providing the dirt sensor 2130.

Although the signal, which is output when the dirt sensor 2130 detects the dirt on the cleaning target surface P of the LiDAR 6f, is input to the control unit 2116 in the above embodiment, the present invention is not limited thereto. For example, it may be configured such that the signal, which is output when the dirt is detected by the dirt sensor 2130, is input to the vehicle control unit 3 (ECU or automatic driving control unit), and a signal for operating at least one of the various cleaner nozzles is input from the vehicle control unit 3 to the control unit 2116.

It may also be configured such that the signal, which is output when the dirt is detected by the dirt sensor 2130, is input to the vehicle control unit 3, and a signal for operating at least one of the various cleaners is input from the vehicle control unit 3 to the various cleaners. In this case, the control unit 2116 is implemented as a portion of the vehicle control unit 3.

Figure 22:
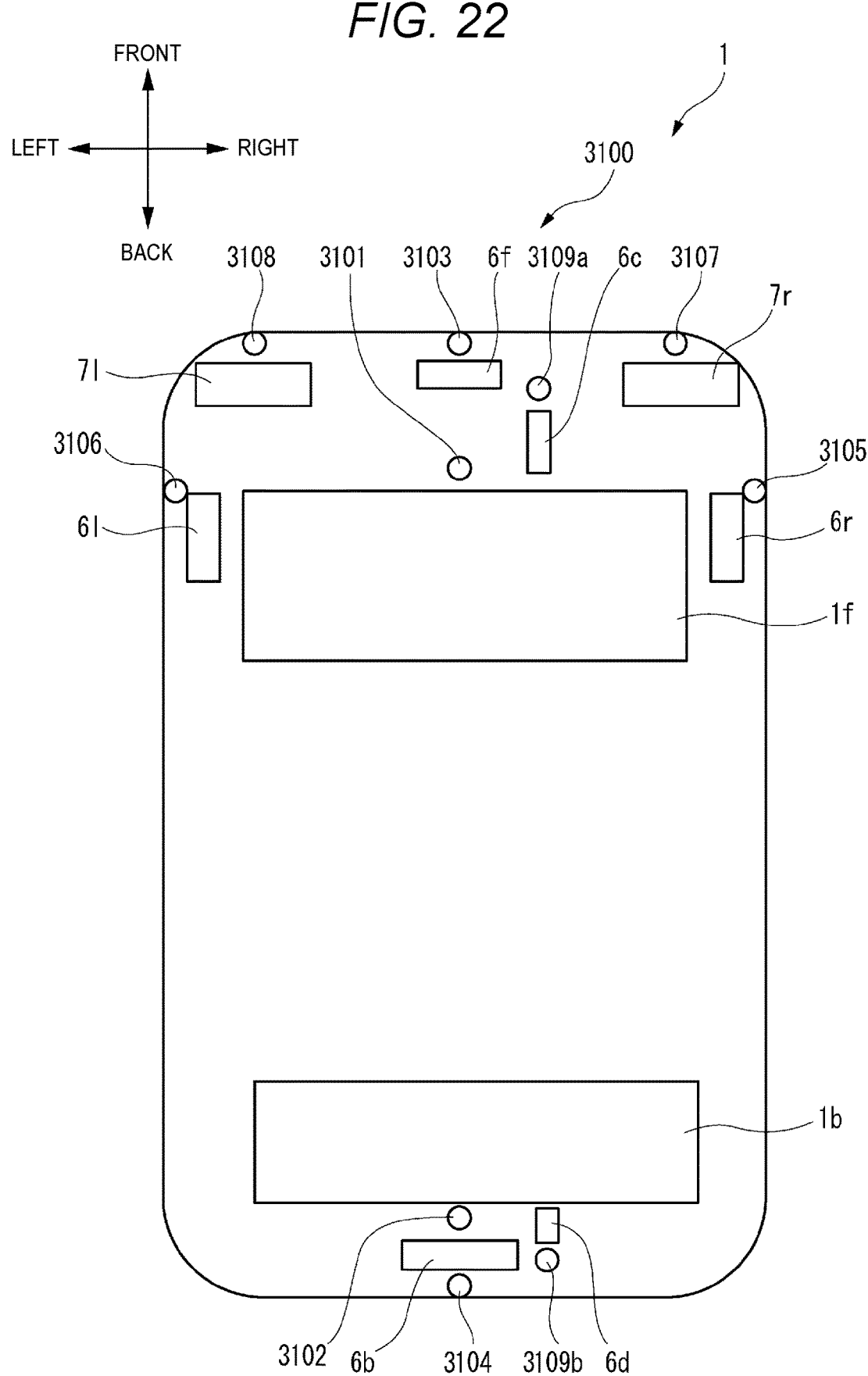
FIG. 22 is a top view of a vehicle mounted with cleaner systems according to a twelfth embodiment and a thirteenth embodiment.

FIG. 22 is a top view of the vehicle 1 on which a vehicle cleaner system 3100 according to twelfth and thirteenth embodiments (hereinafter, referred to as the cleaner system 3100) is mounted. As shown in FIG. 22, the vehicle 1 includes the cleaner system 3100 according to the twelfth and thirteenth embodiments of the present invention. The cleaner system 3100 uses a cleaning medium to remove foreign substances such as water droplets, mud, dust, and the like adhering to a cleaning target object. In the present embodiment, the cleaner system 3100 includes: a front window washer (hereinafter referred to as the front WW) 3101; a rear window washer (hereinafter referred to as the "rear WW") 3102; a front LiDAR cleaner (hereinafter, referred to as the "front LC") 3103; a rear LiDAR cleaner (hereinafter referred to as the "rear LC") 3104; a right LiDAR cleaner (hereinafter referred to as the "right LC") 3105; a left LiDAR cleaner (hereinafter referred to as the "left LC") 3106; a right headlamp cleaner (hereinafter referred to as the "right HC") 3107; a left headlamp cleaner (hereinafter referred to as the "left HC") 3108; a front camera cleaner 3109a; and a rear camera cleaner 3109b. Each of the cleaners 3101 to 3109b includes one or more nozzles, and discharges the cleaning medium, such as cleaning liquid or air, from the nozzles toward the cleaning target object.

The front WW 3101 can be used to clean the front window 1f. The rear WW 3102 can be used to clean the rear window 1b. The front LC 3103 can clean the front LiDAR 6f. The rear LC 3104 can clean the rear LiDAR 6b. The right LC 3105 can clean the right LiDAR 6r. The left LC 3106 can clean the left LiDAR 6l. The right HC 3107 can clean the right headlamp 7r. The left HC 3108 can clean the left headlamp 7l. The front camera cleaner 3109a can clean a front camera 6c. The rear camera cleaner 3109b can clean a rear camera 6d.

Figure 23:
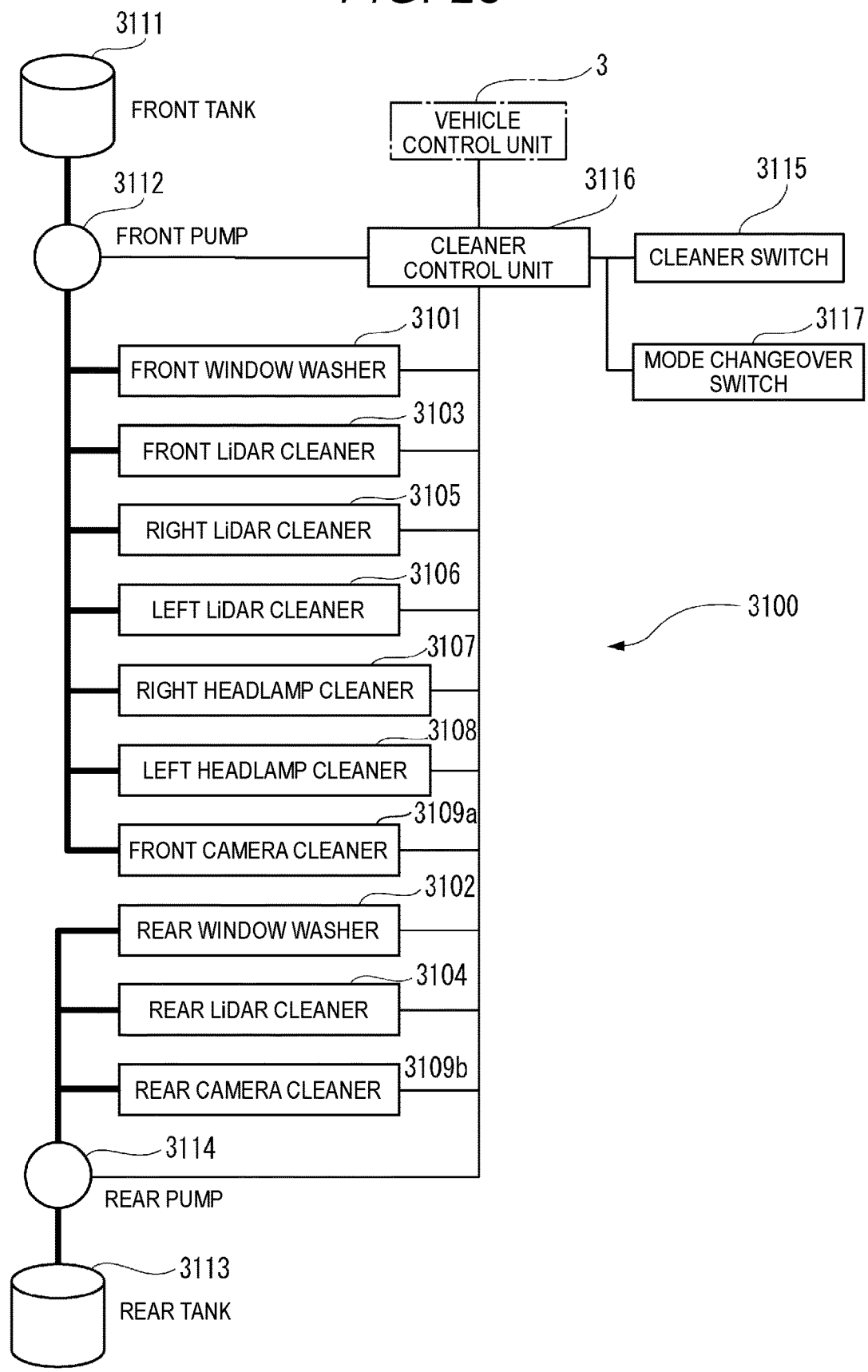
FIG. 23 is a block diagram of the cleaner system of FIG. 22.

FIG. 23 is a block diagram of the cleaner system 3100. In addition to the cleaners 3101 to 3109b, the cleaner system 3100 includes a front tank 3111, a front pump 3112, a rear tank 3113, a rear pump 3114, a cleaner switch 3115, a cleaner control unit 3116 (control unit), and a mode change-over switch 3117.

The front WW 3101, the front LC 3103, the right LC 3105, the left LC 3106, the right HC 3107, the left HC 3108, and the camera cleaners 3109 are connected to the front tank 3111 via the front pump 3112. The front pump 3112 sends cleaning liquid stored in the front tank 3111 to the front WW 3101, the front LC 3103, the right LC 3105, the left LC 3106, the right HC 3107, the left HC 3108, and the front camera cleaner 3109a.

The rear WW 3102 and the rear LC 3104 are connected to the rear tank 3113 via the rear pump 3114. The rear pump 3114 sends cleaning liquid stored in the rear tank 3113 to the rear WW 3102, the rear LC 3104, and the rear camera cleaner 3109b.

Each of the cleaners 3101 to 3109b is provided with an actuator which opens a nozzle and discharges the cleaning liquid to the cleaning target object. The actuators provided in the cleaners 3101 to 3109b are electrically connected to the cleaner control unit 3116. The cleaner control unit 3116 is also electrically connected to the front pump 3112, the rear pump 3114 and the vehicle control unit 3.

Twelfth Embodiment

Figure 24:
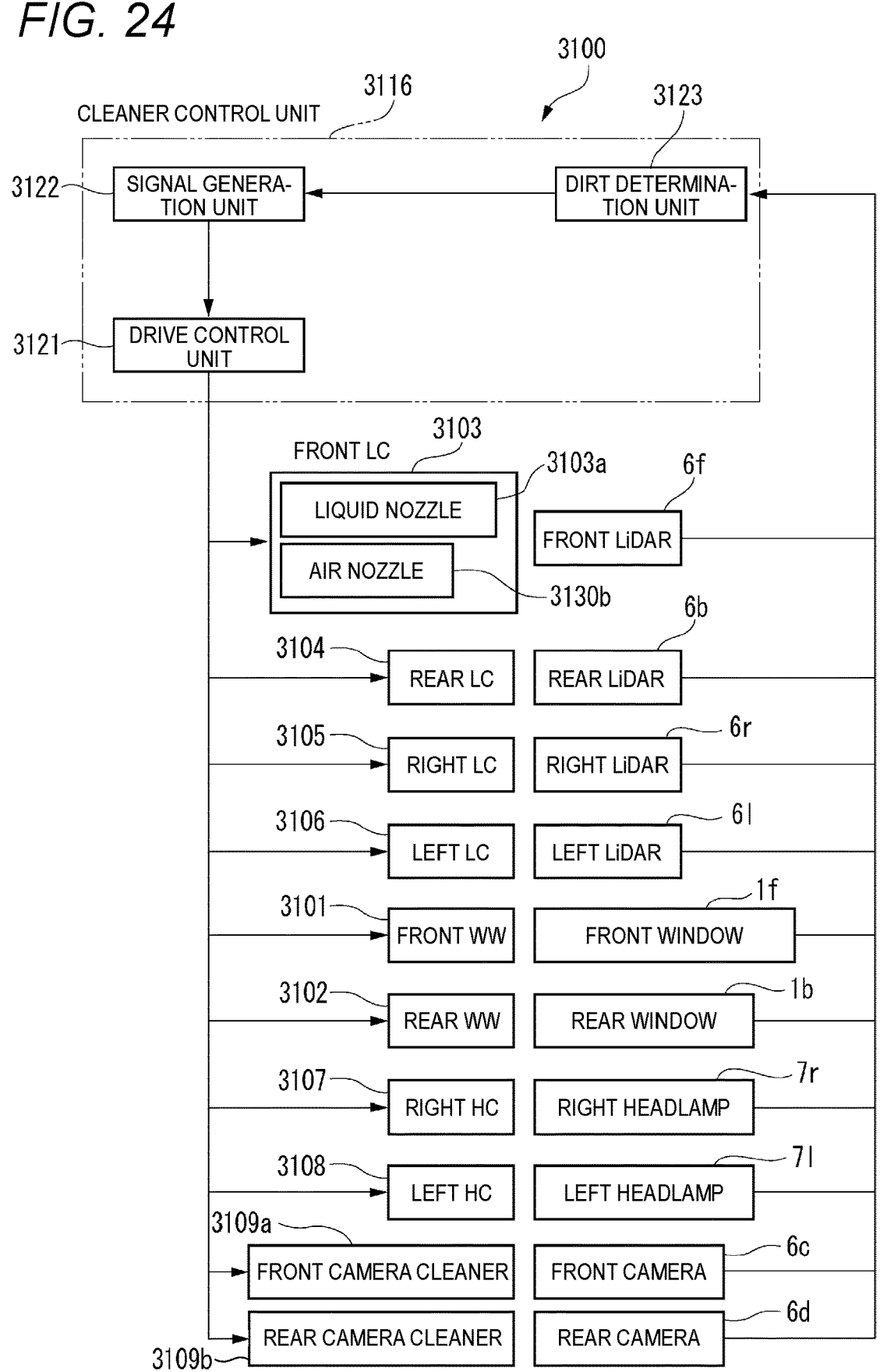
FIG. 24 is a block diagram of the cleaner system according to the twelfth embodiment.

FIG. 24 is a more detailed block diagram of the cleaner system 3100 according to the twelfth embodiment of the present invention. As shown in FIG. 24, the cleaner control unit 3116 includes a drive control unit 3121, a signal generation unit 3122, and a dirt determination unit 3123. The drive control unit 3121 outputs electric signals for operating the cleaners 3101 to 3109b to the cleaners 3101 to 3109b. The signal generation unit 3122 generates a signal to be input to the drive control unit 3121. The dirt determination unit 3123 determines whether there is dirt on the cleaning target object and outputs a dirt signal to the signal generation unit 3122 when it is determined that there is dirt.

The front LC 3103 includes a liquid nozzle 3103a and an air nozzle 3103b. The liquid nozzle 3103a discharges the cleaning liquid supplied from the front tank 3111 toward the front LiDAR 6f. When the drive control unit 3121 outputs the electric signal to the liquid nozzle 3103a, an actuator provided in the liquid nozzle 3103a is operated to discharge the cleaning liquid toward the front LiDAR 6f. The air nozzle 3103b takes in air from surroundings and discharges the taken-in air toward the front LiDAR 6f. When the drive control unit 3121 outputs the electric signal to the air nozzle 3103b, an actuator provided in the air nozzle 3103b is operated to discharge air toward the front LiDAR 6f.

Although liquid nozzles and air nozzles provided in the other cleaners 3101, 3102, and 3104 to 3109b are omitted in FIG. 24, the other cleaners 3101, 3102, and 3104 to 3109b also include liquid nozzles and air nozzles. The same applies to FIGS. 26 and 28. Although an example in which the cleaner control unit 3116 controls the operation of the front LC 3103 is described, in the following description, operation of the other cleaner 3101, 3102 and 3104 to 3109b are also controlled by the cleaner control unit 3116 in the same manner as the front LC 3103.

The drive control unit 3121 outputs the electric signals for operating the various cleaners 3101 to 3109b. The drive control unit 3121 is only input with either a first signal which operates the air nozzle 3103a and the liquid nozzle 3103b, or a second signal which operates the air nozzle 3103a without operating the liquid nozzle 3103b.

Although the cleaning liquid stored in the front tank 3111 is limited, the air can be used without limit as long as the air can be taken in from the surroundings. If the dirt attached to the cleaning target object is slight, such as dust, the dirt can be sufficiently removed by blowing air.

Therefore, in the cleaner system 3100 according to the twelfth embodiment, the signal input to the drive control unit 3121 is only the first signal or the second signal. In other words, when the drive control unit 3121 operates the front LC 3103, the liquid nozzle 3103*b* is not operated without if the air nozzle 3103*a* is not operated. For this reason, operation opportunity of the air nozzle 3103*a* is always equal to or more than operation opportunity of the liquid nozzle 3103*b*. Since the opportunity of cleaning by air is equal to or more than the opportunity of cleaning by cleaning liquid, it is easy to keep the cleaning target object clean while reducing a use amount of the cleaning liquid. Accordingly, frequency of replenishing the cleaning liquid can be reduced, thus the usability is improved.

Figure 25:
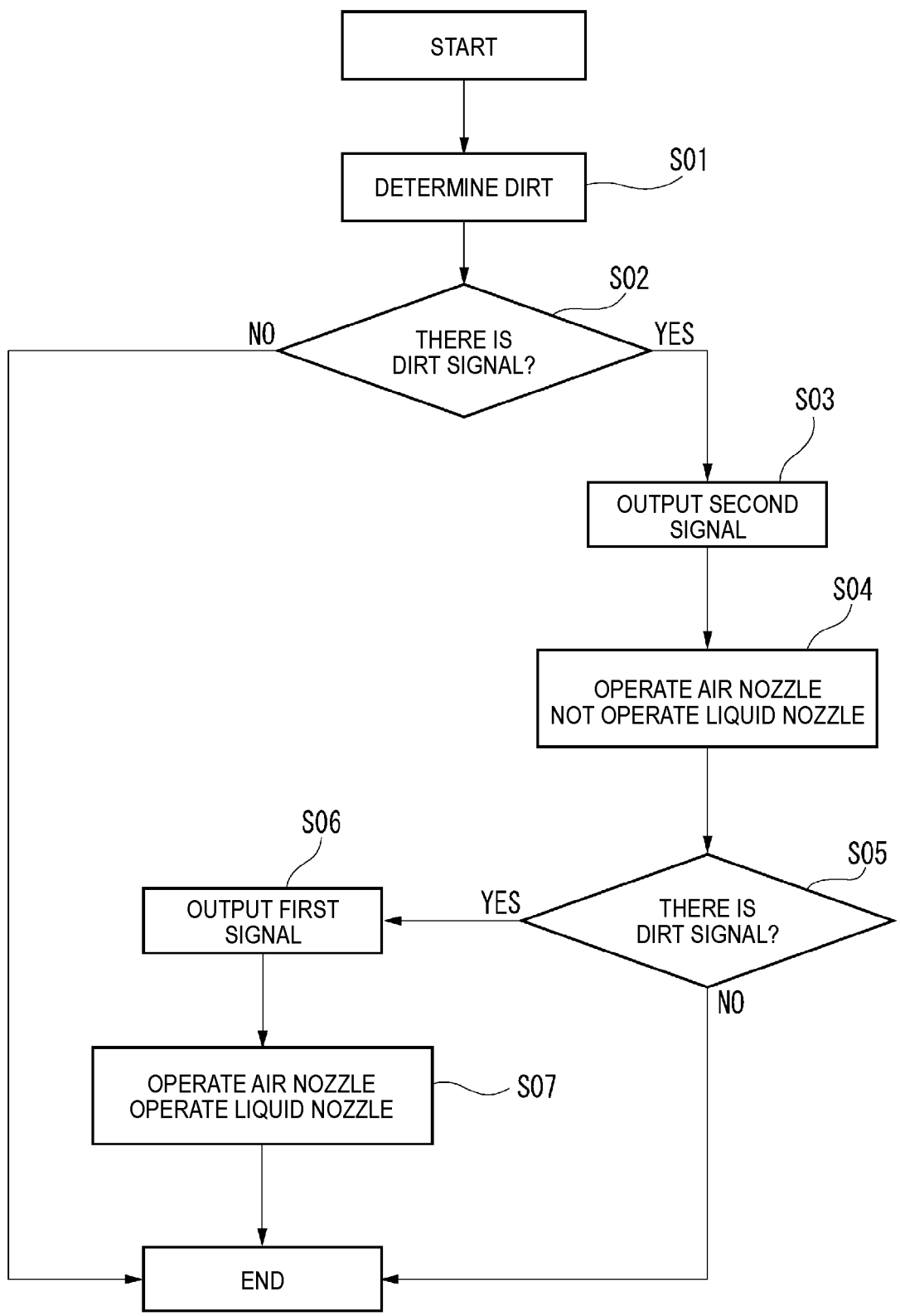
FIG. 25 is a flowchart of the cleaner system according to the twelfth embodiment.

Next, an operation of the cleaner system 3100 configured as described above will be described with reference to FIG. 25. FIG. 25 is a flowchart of processing performed by the cleaner system 3100 according to the twelfth embodiment of the present invention. The cleaner system 3100 periodically and repeatedly performs the processing shown in FIG. 25 at predetermined intervals.

As shown in FIG. 25, first, the dirt determination unit 3123 determines whether the front LiDAR 6*f* is dirty (step S01). The dirt determination unit 3123 outputs the dirt signal to the signal generation unit 3122 if the front LiDAR 6*f* is dirty, and does not output the dirt signal to the signal generation unit 3122 if the front LiDAR 6*f* is not dirty.

Next, the signal generation unit 3122 determines whether the dirt signal is input from the dirt determination unit 3123 (step S02). If the dirt signal is not input (step S02: No), the signal generation unit 3122 does not output the first signal and the second signal to the drive control unit 3121, and the processing is ended.

When the dirt signal is input to the signal generation unit 3122 (step S02: Yes), the signal generation unit 3122 generates the second signal and outputs the second signal to the drive control unit 3121 (step S03). The drive control unit 3121 to which the second signal is input drives the front LC 3103 such that the air nozzle 3103*a* is operated while the liquid nozzle 3103*b* is not operated (step S04).

After outputting the second signal, the signal generation unit 3122 determines whether the dirt signal is input from the dirt determination unit 3123 again (step S05). If the dirt signal is not input after the second signal is output (step S05: No), the signal generation unit 3122 does not output the first signal and the second signal, and the processing is ended.

When the dirt signal is input after the second signal is output (step S05: Yes), the signal generation unit 3122 outputs the first signal to the drive control unit 3116 (step S06). The drive control unit 3121 to which the first signal is input drives the front LC 3103 such that the air nozzle 3103*a* and the liquid nozzle 3103*b* are operated.

It is desirable that the drive control unit 3121 to which the first signal is input operates the air nozzle 3103*a* after the liquid nozzle 3103*b* is operated. By blowing the air onto the cleaning target object after the cleaning liquid is sprayed, droplets of the cleaning liquid attached to the cleaning target object are blown off by the air, and cleanliness of the cleaning target object is more easily maintained.

That is, the cleaner system 3100 according to the twelfth embodiment includes:

the dirt determination unit 3123 which detects dirt of the vehicle components 1*f*, 1*b*, 6*f*, 6*b*, 6*r*, 6*l*, 6*c*, 6*d*, 7*r* and 7*l*, and outputs the dirt signal when dirt is detected on at least one of the above vehicle components; and the signal generation unit 3122 which generates the first signal or the second signal to be input to the drive control unit 3121.

The signal generation unit 3122 outputs the second signal to the drive control unit 3121 in accordance with the dirt signal output from the dirt determination unit 3123.

The signal generation unit 3122 outputs the first signal to the drive control unit 3121 when the dirt signal is received after the second signal is transmitted.

According to the cleaner system 3100 having the above configuration, if the dirt is not removed by blowing air, the cleaning liquid is sprayed to remove the dirt. Since at first only the air is blown to remove the dirt, consumption of the cleaning liquid can be reduced as compared with a case where the cleaning liquid is used at first to remove the dirt. Accordingly, the cleanliness of the cleaning target object is easily maintained while the consumption of the cleaning liquid is reduced.

Thirteenth Embodiment

Figure 26:
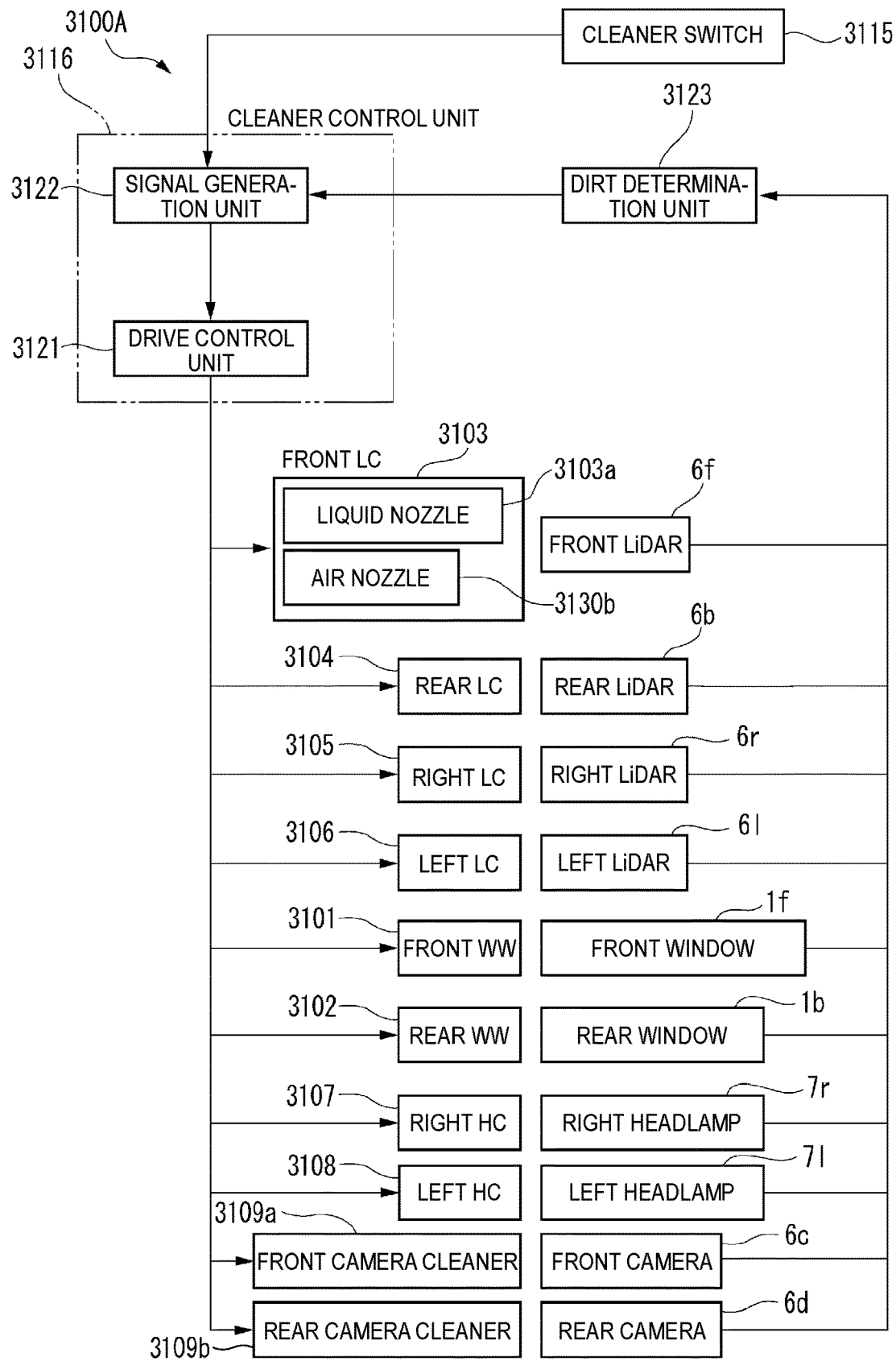
FIG. 26 is a block diagram of the cleaner system according to the thirteenth embodiment.
Figure 27:
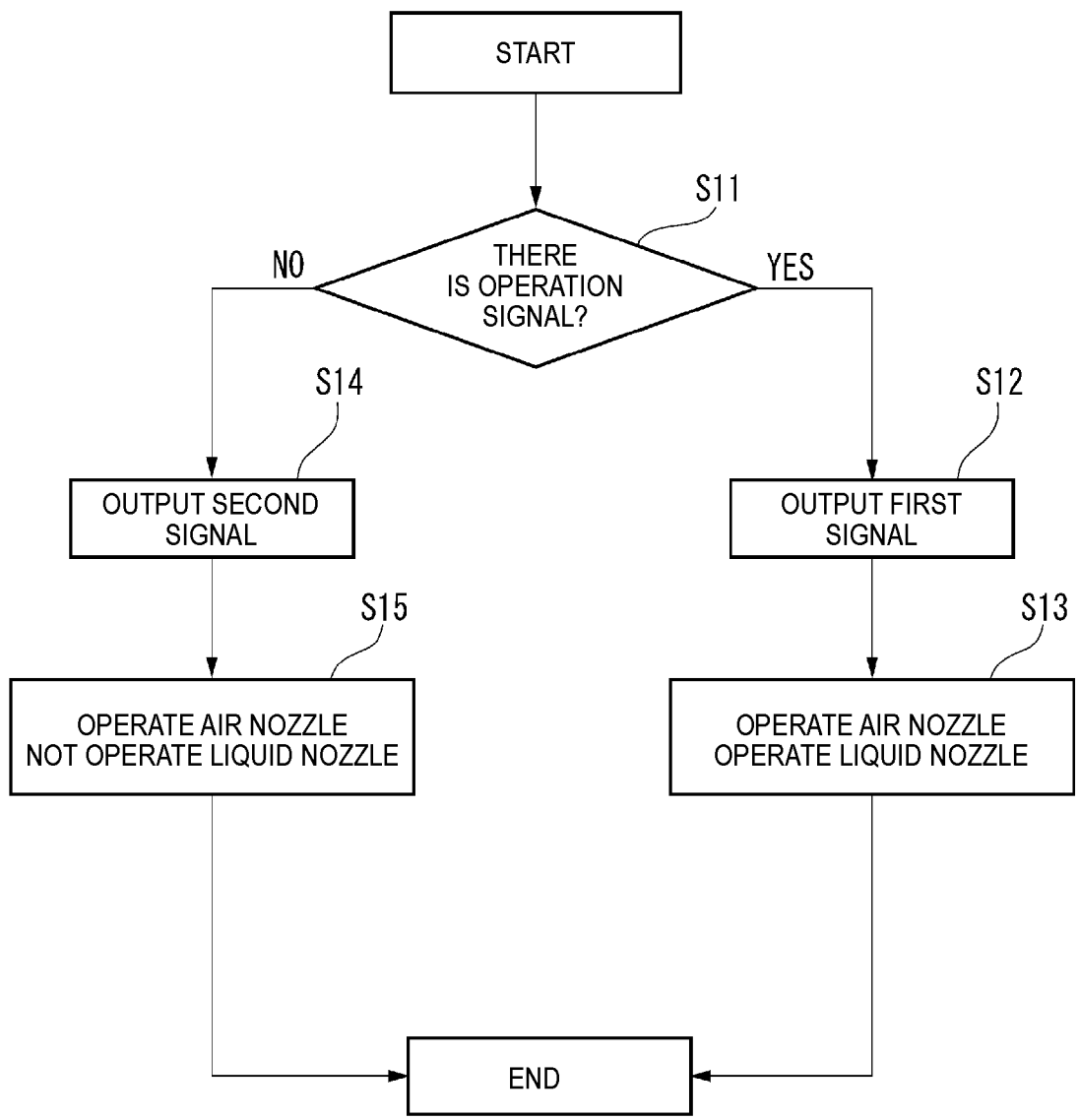
FIG. 27 is a flowchart of the cleaner system according to the thirteenth embodiment.

Next, a cleaner system 3100A according to the thirteenth embodiment of the present invention will be described. FIG. 26 is a block diagram of the cleaner system 3100A according to the thirteenth embodiment of the present invention. FIG. 27 is a flowchart of processing performed by the cleaner system 3100A according to the thirteenth embodiment. Description of elements common to the cleaner system 3100 according to the twelfth embodiment will be omitted.

As shown in FIG. 26, in the cleaner system 3100A, the cleaner switch 3115 can output an electric signal to the signal generation unit 3122. The cleaner switch 3115 is provided in the vehicle compartment and can be operated by an occupant. When the occupant operates the cleaner switch 3115, an operation signal is output to the signal generation unit 3122 in accordance with the operation.

The cleaner control unit 3116 periodically and repeatedly perform the processing of steps S11 to S15 shown in FIG. 27 at predetermined intervals.

First, the signal generation unit 3122 determines whether the operation signal is input from the cleaner switch 3115 (step S11).

When the operation signal is not input (step S11: No), the signal generation unit 3122 outputs the second signal to the drive control unit 3121 (step S14). The drive unit 3121 to which the second signal is input drives the front LC 3103 such that the air nozzle 3103*a* is operated while the liquid nozzle 3103*b* is not operated. That is, as long as the user does not operate the cleaner switch 3115, the signal generation unit 3122 of the cleaner system 3100A periodically output the second signal to the drive control unit 3121 at predetermined intervals.

Meanwhile, when the operation signal is input (step S11: Yes), the signal generation unit 3122 outputs the first signal to the drive control unit 3121 (step S12). The drive control unit 3121 to which the first signal is input drives the front LC 3103 such that the air nozzle 3103*a* and the liquid nozzle 3103*b* are operated (step S13).

That is, the cleaner system 3100A according to the thirteenth embodiment includes:

the signal generation unit 3122 which generates the first signal or the second signal to be input to the drive control unit 3121.

The signal generation unit 3122 periodically output the second signal to the drive control unit 3121 at predetermined intervals.

The signal generation unit 3122 outputs the first signal to the drive control unit 3121 when the operation signal output by the operation unit 3115, which outputs the signal in accordance with the operation of the user, is input to the signal generation unit 3122.

According to the cleaner system 3100A configured as described above, since the cleaning target object is periodically cleaned, the cleanliness of the cleaning target object is easily maintained. At this time, since the periodic cleaning is performed only by the air, the cleaning liquid is not consumed. Meanwhile, when the user notices the dirt of the cleaning target object, the cleaning is performed using both the air and the cleaning liquid by operating the cleaner switch 3115, so that the dirt can be effectively removed. As described above, the cleaner system 3100A can easily maintain the cleaning target object in a clean state while reducing the consumption of the cleaning liquid, and can effectively remove the dirt when the user desires to clean.

As shown in FIG. 26, in addition to a configuration in which the signal is input by the cleaner switch 3115 to the signal generation unit, the cleaner system 3100A may have a configuration in which the signal is input by the dirt determination unit 3123 described in the twelfth embodiment to the signal generation unit.

Fourteenth Embodiment

Figure 28:
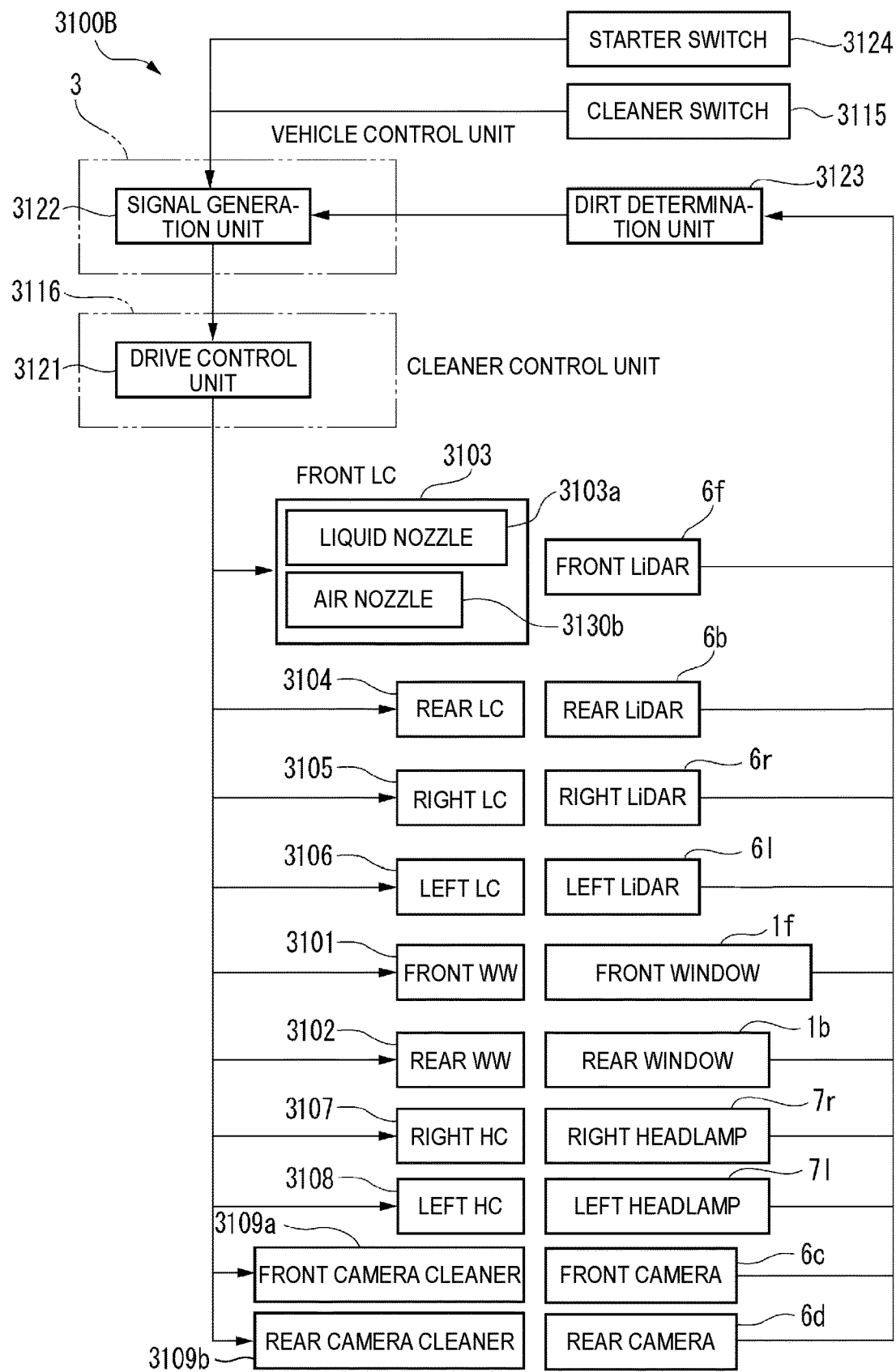
FIG. 28 is a block diagram of a cleaner system according to a fourteenth embodiment.

Next, a cleaner system 3100B according to a fourteenth embodiment of the present invention will be described. FIG. 28 is a block diagram of the cleaner system 3100B according to the fourteenth embodiment of the present invention. Description of elements common to the cleaner system 3100A according to the thirteenth embodiment will be omitted.

As shown in FIG. 28, in the cleaner system 3100B, a starter switch 3124 can output an electric signal to the signal generation unit 3122. The starter switch 3124 is provided in the vehicle compartment and can be operated by an occupant. When the occupant operates the starter switch 3124, an engine is started in a vehicle which is mounted with the engine or a vehicle system is turned on in case of an electric vehicle. When the occupant operates the starter switch 3124, a starter signal is output to the signal generation unit 3122 in accordance with to the operation.

The cleaner system 3100B outputs the second signal to the drive control unit 3121 when the starter signal of the starter switch 3124 is input to the signal generation unit 3122. The cleaner system 3100B outputs the first signal to the drive control unit 3121 when the operation signal output by the starter switch 3115, which outputs the signal in accordance with the operation of the user, is input to the signal generation unit 3122. When the dirt signal is input from the dirt determination unit 3123 to the signal generation unit 3122, the signal generation unit 3122 outputs the second signal to the drive control unit 3121.

The signal generation unit 3122 is realized as a portion of the vehicle control unit 3, and the drive control unit 3121 is realized as a portion of the cleaner control unit 3116. In this way, the signal generation unit 3122 and the drive control unit 3121 can be realized as portions of the vehicle control unit 3 or as portions of the cleaner control unit 3116. Alternatively, the cleaner control unit 3116 may include all of the drive control unit 3121, the signal generation unit 3122, and the dirt determination unit 3123. The vehicle control unit 3 may include all of the drive control unit 3121, the signal generation unit 3122, and the dirt determination unit 3123.

According to the cleaner system 3100B according to the fourteenth embodiment, since the cleaning target object is always cleaned with the air when the engine is started or when the vehicle system is turned on, use of the vehicle 1 can be started in a clean state. At this time, the cleaning target object is cleaned only by the air without consuming the cleaning liquid. For this reason, when the cleaning target object is not dirty at the start of the use of the vehicle 1, the cleaning liquid is not wasted.

Although an example in which the cleaner control unit 3116 controls the operation of the front LC 3103 is described in the twelfth to fourteenth embodiments described above, the same control may be performed on the other cleaners 3101, 3102 and 3104 to 3109b. Alternatively, the above control may be performed on at least one of the cleaners 3101 to 3109b.

However, the present invention is desirably applied to the drive control unit 3121 which controls drive of the sensor cleaners 3103 to 3106 for cleaning the external sensor 6. In the vehicle traveling in the automatic driving mode, the external sensor 6 is required to be kept clean as compared with the front window 1f and the headlamp 7, and the number of times of cleaning of the external sensor 6 increases. According to the present invention, the use amount of the cleaning liquid can be reduced as compared with a case where the external sensor 6 is cleaned only with the cleaning liquid, and the frequency of replenishing the cleaning liquid can be reduced.

Although a configuration in which all the cleaners 3101 to 3109b include the liquid nozzle and the air nozzle has been described in the twelfth to fourteenth embodiments described above, a configuration in which at least one of the cleaners 3101 to 3109b includes the liquid nozzle and the air nozzle while the other cleaners 3101 to 3109b only include the liquid nozzles or the air nozzles may be adopted.

Although the cleaner system 3100 has been described as including the external sensor 6 in the embodiments described above, the cleaner system 3100 may not include the external sensor 6. However, it is preferable that the cleaner system 3100 is configured as an assembly including the external sensor 6, so that positioning accuracy of the cleaners 3103 to 3106, 3109a and 3109b is easy improved with respect to the external sensor 6. Since the external sensor 6 can also be incorporated together when the cleaner system 3100 is mounted on the vehicle 1, ease of assembling the external sensor 6 to the vehicle 1 is also improved.

As for the cleaners for cleaning the external sensor 6, in the embodiment described above, it is described that the 3103 to 3106 clean the LiDARs 6f, 6b, 6r and 6l, the 3109a cleans the front camera 6c, and the 3109b cleans the rear camera 6d, the present invention is not limited thereto. The cleaner system 3100 may include a cleaner for cleaning the radar or the like instead of the sensor cleaners 3103 to 3106, 3109a and 3109b, or may include the sensor cleaners 3103 to 3106, 3109a and 3109b as well.

Although an example in which the cleaners 3101, 3103, 3105 to 3109a are connected to the front tank 3111, and the cleaners 3102, 3104 and 3109b are connected to the rear tank 3113 is described in the embodiments described above, the present invention is not limited thereto.

The cleaners 3101 to 3109b may be connected to a single tank. The cleaners 3101 to 3109b may be connected to different tanks.

Alternatively, the cleaners 3101 to 3109b may be connected to a common tank for each type of cleaning target object. For example, the LCs 3103 to 3106 may be connected to a common first tank, and the HCs 3107 and 3108 may be connected to a second tank different from the first tank.

Alternatively, the cleaners 3101 to 3109b may be connected to a common tank for each arrangement position of the cleaning target object. For example, the front WW 3101, the front LC 3103, and the front camera cleaner 3109a may be connected to a common front tank, the right LC 3105 and the right HC 3107 may be connected to a common right tank, the rear WW 3102, the rear LC 3104, and the rear camera cleaner 3109*b* may be connected to a common rear tank, and the left LC 3106 and the left HC 3108 may be connected to a common left tank.

Although an example in which the cleaning medium is discharged from the cleaners 3101 to 3109*b* by operating the actuators provided in the cleaners 3101 to 3109*b* has been described in the embodiments described above, the present invention is not limited thereto.

A configuration, in which normally closed valves are provided in each of the cleaners 3101 to 3109*b*, the pump is operated such that a pressure between the tank and the cleaners 3101 to 3109*b* is always high, and the cleaner control unit 3116 opens the valves provided in the cleaners 3101 to 3109*b* to discharge the cleaning medium from the cleaners 3101 to 3109*b*, may be adopted.

Alternatively, a configuration, in which each of the cleaners 3101 to 3109*b* is connected to a separate pump, and the cleaner control unit 3116 controls each of the pumps individually so as to control the discharge of the cleaning medium from the cleaners 3101 to 3109*b*, may be adopted. In this case, each of the cleaners 3101 to 3109*b* may be connected to different tanks, or may be connected to a common tank.

Although the embodiments of the present invention have been described above, it is needless to say that the technical scope of the present invention should not be interpreted as being limited to the description of the embodiments. The present embodiments are merely examples and it is to be understood by those skilled in the art that various modifications of the embodiments can be made within the scope of the invention described in the claims. The technical scope of the present invention should be determined based on the scope of the invention described in the claims and the scope of equivalents thereof.

This application is based on JP-A-2017-115872 filed on Jun. 13, 2017, JP-A-2017-115873 filed on Jun. 13, 2017, JP-A-2017-115875 filed on Jun. 13, 2017, and JP-A-2017-115877 filed on Jun. 13, 2017, the contents of which are incorporated herein by reference.

The invention claimed is:

1. A vehicle cleaner system, comprising:
   a single liquid pump;
   a plurality of cleaners which are connected to the single liquid pump and clean different cleaning target objects with a cleaning medium, the cleaning target objects including at least one sensor which detects information on outside of a vehicle, a window, and a headlamp;
   a cleaner control unit which operates the plurality of cleaners in a selected cleaning mode from a plurality of cleaning modes in accordance with input of operation signals, the plurality of cleaning modes being different from each other; and
   a signal generation unit which, upon receiving a starter signal from the vehicle, generates a number of the operation signals periodically at predetermined intervals to be output to the cleaner control unit;
   wherein
   the cleaner control unit selects the selected cleaning mode based on a selected driving mode of the vehicle from a plurality of driving modes comprising an automatic driving mode and a manual driving mode and based on a brightness surrounding the vehicle,
   each of the plurality of cleaners is provided with an actuator electrically connected to the cleaner control unit and configured to open the cleaner and to discharge the cleaning liquid to the cleaning target object,
   the cleaner control unit is configured to operate the respective actuators of the plurality of cleaners in accordance with the operation signals such that a magnitude relationship between a number of times of open operations of the plurality of cleaners and the number of the operation signals during a period of operation differs from each other, and
   when the vehicle is driven in an automatic driving mode, the cleaner control unit controls the operation of the actuators of the plurality of cleaners such that the number of times of open operations of the cleaner for the window is larger than the number of times of open operations of the cleaner for the at least one sensor, and the number of times of open operations of the cleaner for the at least one sensor is larger than the number of times of open operations of the cleaner for the headlamp.

2. The vehicle cleaner system according to claim 1, wherein
   a spray pressure of the cleaning medium in the cleaner for the at least one sensor is higher than a spray pressure of the cleaning medium in the cleaner for the headlamp.

3. The vehicle cleaner system according to claim 1, further comprising an air pump,
   wherein cleaning liquid and air are supplied to the cleaner for the at least one sensor as the cleaning medium.

4. The vehicle cleaner system according to claim 1, wherein
   the at least one sensor includes a plurality of sensors being different from each other in at least one of a detection method and a mounting position in the vehicle, and
   the cleaner control unit is configured to operate the plurality of cleaners such that cleaning methods for the plurality of sensors are different from each other.

5. A vehicle, comprising:
   the vehicle cleaner system described in claim 1.

* * * * *